(12) United States Patent
Sanders

(10) Patent No.: US 10,421,441 B2
(45) Date of Patent: Sep. 24, 2019

(54) SUPPLEMENTAL BRAKING DEVICE FOR A TOWED VEHICLE

(71) Applicant: Rodney W. Brazel, Inc., Olympia, WA (US)

(72) Inventor: Alan Sanders, Centralia, WA (US)

(73) Assignee: Rodney W. Brazel, Inc., Centralia, WA (US)

(*) Notice: Subject to any disclaimer, the term of this patent is extended or adjusted under 35 U.S.C. 154(b) by 0 days.

(21) Appl. No.: 16/040,280

(22) Filed: Jul. 19, 2018

(65) Prior Publication Data

US 2019/0016314 A1 Jan. 17, 2019

Related U.S. Application Data

(63) Continuation-in-part of application No. 15/346,384, filed on Nov. 8, 2016, now Pat. No. 10,077,034.

(51) Int. Cl.
| | | |
|---|---|---|
| *B60T 7/20* | (2006.01) | |
| *B60T 13/66* | (2006.01) | |
| *B60T 8/171* | (2006.01) | |
| *B60T 8/172* | (2006.01) | |
| *B60T 8/17* | (2006.01) | |

(52) U.S. Cl.
CPC ............... *B60T 7/20* (2013.01); *B60T 8/171* (2013.01); *B60T 8/172* (2013.01); *B60T 8/1708* (2013.01); *B60T 13/662* (2013.01); *B60T 2201/03* (2013.01)

(58) Field of Classification Search
CPC ...... B60T 8/1708; B60T 8/171; B60T 13/741; B60T 17/223; B60T 7/20
See application file for complete search history.

(56) References Cited

U.S. PATENT DOCUMENTS

| | | |
|---|---|---|
| 2,039,509 A | 5/1936 | Adams |
| 3,866,719 A | 2/1975 | Streutker |
| 5,031,729 A | 7/1991 | Wittkop et al. |
| 5,411,321 A | 5/1995 | Harness |
| 5,431,253 A | 7/1995 | Hargrove |
| 5,465,813 A | 11/1995 | Lichter |
| 5,503,468 A | 4/1996 | Saffran |
| 5,626,402 A | 5/1997 | Saffran |
| 5,911,483 A | 6/1999 | Overhulser |
| 5,915,798 A | 6/1999 | Ford |
| 5,954,164 A | 9/1999 | Latham |
| 6,033,034 A | 3/2000 | Elkins |

(Continued)

*Primary Examiner* — Thomas W Irvin
(74) *Attorney, Agent, or Firm* — Williams Kastner & Gibbs PLLC; Mark Lawrence Lorbiecki

(57) ABSTRACT

A system and method for braking a flat-towed vehicle based upon a braking pressure of a braking fluid in a braking circuit in the towing vehicle, the method includes measuring a piezoresistor voltage drop across a piezoresistor positioned within the braking circuit such that the piezoresistor voltage drop changes in response to the braking pressure within the braking circuit. Based upon the measured piezoresistor voltage drop, a motor frame duration is retrieved. A clutch engages the motor output shaft to initiate a clutch frame. Upon expiration of a programmed clutch delay, a motor frame initiates by supplying power to a motor. Upon expiration of the motor frame duration, power to the motor is interrupted. The clutch continues to be engaged for the duration of the clutch frame. The clutch releases allowing a capstan attached to the clutch to spin freely relative to the motor output shaft.

22 Claims, 10 Drawing Sheets

(56) References Cited

U.S. PATENT DOCUMENTS

| | | | |
|---|---|---|---|
| 6,152,544 | A | 11/2000 | Greaves |
| 6,158,823 | A | 12/2000 | Schuck |
| 6,280,004 | B1 | 8/2001 | Greaves |
| 6,626,504 | B2 | 9/2003 | Harner et al. |
| 6,874,602 | B2 | 4/2005 | Greaves |
| 8,430,458 | B2 | 4/2013 | Kaminski et al. |
| 9,073,524 | B2 | 7/2015 | Cusi |
| 2002/0030405 | A1 | 3/2002 | Harner et al. |
| 2002/0128764 | A1 | 9/2002 | Hecker et al. |
| 2002/0163249 | A1 | 11/2002 | Palmer et al. |
| 2005/0011693 | A1 | 1/2005 | Horn et al. |
| 2005/0225169 | A1 | 10/2005 | Skinner et al. |
| 2007/0102996 | A1 | 5/2007 | Kelly et al. |
| 2007/0256878 | A1 | 11/2007 | Tandy |
| 2007/0260387 | A1 | 11/2007 | Tandy |
| 2010/0152920 | A1 | 6/2010 | McCann |
| 2015/0275991 | A1 | 10/2015 | De Leon |

SUPPLEMENTAL BRAKING DEVICE FOR A TOWED VEHICLE

RELATED APPLICATION

This is a continuation-in-part of the co-pending application Ser. No. 15/345,384 dated Nov. 8, 2016 entitled "Supplemental Braking Device for a Towed Vehicle," and incorporated in its entirety by this reference.

FIELD OF THE INVENTION

The inventive supplemental braking device is a remote braking actuator and a method of use of such a device from the field comprising safety devices for towing a vehicle.

BACKGROUND OF THE INVENTION

To the avid recreational vehicle driver, having available a smaller vehicle to use after reaching a campsite proves to be useful. For example, it is far easier to park a smaller vehicle in the parking lot outside of a grocery store than a full-sized recreational vehicle. The towing of a smaller vehicle has become a part of the recreational vehicle such that the towed vehicle is regularly referred to as a "dinghy" analogizing the operation of a recreational vehicle to piloting a boat. A dinghy eliminates the need to break camp and stow everything each time the driver needs (or wants) to venture away from the campground. Additionally, the dinghy can stow gear securely when recreational vehicle storage is filled (within weight restrictions), and there is the sense of security engendered by having a spare vehicle for immediate transportation in the event of an emergency, such as an injury requiring attention at a local emergency room.

Nonetheless, despite the acknowledged utility of towing a towed vehicle or "dinghy", there are also acknowledged difficulties. One arrangement to facilitate towing is use of the simple tow bar where all four of the towed vehicle's wheels will rotate in contact with the surface of the roadway (as opposed to using a dolly or trailer to support two or four of the wheels respectively). Among recreational vehicle owners, this arrangement is known as flat lowing, or four-wheels-down towing and employs a tow bar between the towed and towing vehicles. Importantly, in using a tow bar to pull the towed vehicle, the recreational vehicle must then both accelerate and decelerate a mass that is greater by approximately one sixth of the recreational vehicle's own mass. While beefing up the engine in the recreational vehicle can usually appropriately address the acceleration of the combined mass of the two vehicles, stopping that combined mass presents another issue.

Even if the braking capacity of the recreational vehicle is sufficient to slow the combined mass of the recreational vehicle and the towed vehicle, when the only braking is that applied by the towing vehicle, the stopping distance from any given speed will be lengthened significantly. The momentum the towed vehicle contributes much more mass that must also be slowed along with the towing vehicle. When compared to stopping without the towed vehicle, decelerating that additional mass simply requires more braking force to slow the vehicles.

A solution readily asserts itself: each of the towing and towed vehicles have braking systems sufficient to safely stop those vehicles when used as separate vehicles. If both vehicles could suitably brake its own mass with its own braking system, the composite train of towing and towed vehicles can be slowed efficiently. Many recreational vehicle drivers elect to implement the towed vehicle's own braking mechanism by means of remote activation to enhance the braking action of the vehicles when used together. Generally termed "supplemental braking mechanisms," these systems include instrumentation used to activate the towed vehicle's braking system in concert with that of the to wing vehicle. In applying the supplemental braking, the total necessary force to decelerate the combined mass of the recreational vehicle and the towed vehicle is spread across the eight or more wheels the two vehicles comprise, thereby allowing each wheel to slow the vehicles rather than merely the four or so the towing vehicle controls.

In rough cut, this solution should work but the problem is in applying the brakes appropriately in the towed vehicle. Nonetheless, the need for stopping each of the towed and towing vehicles is universally recognized. For example, in executing panicked stops, the need for supplemental braking is clearly demonstrated. Without supplemental braking, stopping distances are simply too long to avoid collision or catastrophe, and such stops are the leading cause of towing vehicle braking system failure. So recognized is this danger that nearly every state and Canadian province requires a supplemental braking system on all towed vehicles over a certain weight, in the same way that they require brakes on trailers of a certain weight.

The tort system too recognizes the efficacy of supplemental braking. Because of the increased stopping distances when towing a vehicle without supplemental braking, accidents that could have been avoided still occur. In civil actions for negligence, if an accident that could have been avoided within the bounds of the towing vehicle's regular stopping distance occurs due to the added mass of the towed vehicle, a driver is much more likely to be found liable. The lack of a supplemental braking system is, as in failing to maintain a braking system in proper working order, a distinct act of negligence resulting in liability due to causation.

Several types of supplemental braking systems exist within the prior art. The most basic type of supplemental braking system is a portable, electric brake controller that applies the towed vehicle brakes at a fixed pressure over a duration defined by a voltage applied to the towing vehicle brake lights as received from the brake light switch in the towing vehicle. These systems act using relays to trigger brake "on" in the towed vehicle. The towed vehicle is either in a braked or freewheeling state based upon the voltage at the brake light. A brake light is either on or off and thus these prior art brake systems can only apply a single selected pressure on the towed vehicle's brakes when activated. This two-state system lacks the ability to exert a pressure proportionate to that applied in the recreational vehicle.

Just as with the brake lights that trigger it, the system is either "on" or "off" with no degrees of application. For that reason, the application of brakes in the towed vehicle is very uneven and only roughly matched to that in the towing vehicle. More sophisticated versions of the systems have an ability to predesignate a selected amount of pressure to apply to the towed vehicle braking system in response to the signal from the towing vehicle. Rather than simply applying a maximum pressure to the brake system, these systems apply pressure at a fixed pressure predesignated as, for example, "light", "medium" or "heavy". Trial and error allow a technician to "tune" the towed and towing vehicle train to select what proves, in practice, to be the smoothest of the designations available for this setting. Even when "tuned" in this fashion, the application of the brakes in the towed vehicle are not always optimal. For example, in light braking of the towing vehicle, the dinghy applies the preset pressure and acts as an anchor; in heavy braking, by contrast, the preset pressure might not supply enough braking force and the dinghy pushes the towing vehicle. Either option tends to lengthen stopping distances from what is optimal. Nonetheless, the stopping distances are far shorter than those produced by a system without supplemental braking. For that reason and the lack of expense, simplicity and reliability of these systems make them popular among RV enthusiasts.

A second system which seeks to achieve a closer to optimal braking distance is known as a proportionate braking system. Rather than a single pre-selected braking force, the proportionate system works by applying a braking force in proportion to deceleration experienced by the towed vehicle. Most proportionate systems exploit an inertial sensor such as a pendulum or accelerometer (such as a MEMS sensor implemented in an integrated circuit chip) to select a braking force in an intensity proportionate to the deceleration measured from a mounting point in the towing vehicle.

Because in this second system, the degree of braking is based upon sensed deceleration experience in the towing vehicle, in the case of hard deceleration, picking a proper relationship between sensed deceleration and applied braking in the towed vehicle dictates how closely the system approaches optimal braking. The ratio between sensed deceleration and degree of braking force applied in the towed vehicle is expressed as a coefficient. Selection of a suitable coefficient is necessary for belter braking. For example, should the proportion of applied braking force relative to experienced deceleration be set to apply too great a pressure, the braking of the towed vehicle will drag the towing vehicle causing it to experience a further deceleration or, at the extreme, to simply lock up the brakes of the towed vehicle causing it to skid and drive the towing vehicle forward. At very least, this has the highly undesirable effect of wearing the towed vehicle brakes unduly while not shortening stopping distances. When properly adjusted, however, the system can approximate braking ranging from heavy-duty emergency braking, to general everyday braking and, in the extreme, slow-to-an-idle braking. Unfortunately, because the system is based upon the experienced and measured deceleration, there is a latency in the system, i.e. a delay between the onset of braking in the towing vehicle and the application of brakes in the towed vehicle, the vehicles do not brake in a synchronized manner. The differences in brake application tend to exert larger than necessary forces at the connection between the two vehicles and unevenly wear the brakes as between the two vehicles.

A third class of supplemental braking systems is known as "direct" because they use the towing system braking fluid to move a piston in a cylinder which, in turn depresses the towed vehicle brake pedal, just as that fluid is also used to close a brake caliper. Direct systems require a much more comprehensive installation process than most other systems, but they deliver superior braking. Like basic proportional systems, direct systems offer a whole spectrum of brake application intensities from emergency braking to slow-to-an-idle braking action; yet they have a far better response time and require little or no manual adjustment. Direct systems tap into the towing vehicle's brake lines using fluid (either air or hydraulic fluid) to move a piston in an actuator which operates similarly to the calipers on a brake. The actuator, in turn, applies a force on the fluid of the towed vehicle's brake system to sense the pedal movement in the towing vehicle so that the actuator in the dinghy can replicate that same timing and pressure in the towed vehicle. Essentially, a direct system acts as an additional circuit in the towing vehicle, such that brake pressure in either an air or hydraulic system in the towing vehicle drives a piston in a cylinder to similarly assert a pressure in the towed vehicle's system as would a foot on the brake pedal.

As stated above, because such a system functions as an extension of the brake system of the towing vehicle, installation and removal of the system tends to be a very elaborate task. Also, because the entire system must apply both vehicle's brakes, the necessary pedal travel in the towing vehicle lengthen and braking response tends to be "slushy." Further, the actuators that link the systems must be very specifically engineered for the two vehicles such that pedal travel asserted by the actuator on the towed vehicle's brake pedal achieves the same slowing effect on the towed vehicle as the driver's foot asserts in the towing vehicle. These units tend to be very expensive because of the nearly custom nature of the installation.

What is needed in the art is a system that does not require elaborate installation and can be readily switched from a towed configuration to an operating configuration for ready use of the towed vehicle as a dinghy. Inherent or nontechnical synchronization of the asserted braking force to that experienced in the towing vehicle is necessary for safe operation.

SUMMARY OF THE INVENTION

A system and method for braking a flat-towed vehicle based upon a braking pressure of a braking fluid in a braking circuit in the towing vehicle, the method includes measuring a piezoresistor voltage drop across a piezoresistor positioned within the braking circuit such that the piezoresistor voltage drop changes in response to the braking pressure within the braking circuit. Based upon the measured piezoresistor voltage drop, a motor frame duration is retrieved. A clutch engages the motor output shaft to initiate a clutch frame. Upon expiration of a programmed clutch delay, a motor frame initiates by supplying power to a motor. Upon expiration of the motor frame duration, power to the motor is interrupted. The clutch continues to be engaged for the duration of the clutch frame. The clutch releases allowing a capstan attached to the clutch to spin freely relative to the motor output shaft.

BRIEF DESCRIPTION OF THE DRAWINGS

Preferred and alternative examples of the present invention are described in detail below regarding the following drawings.

DETAILED DESCRIPTION OF THE PREFERRED EMBODIMENT

Figure 1:
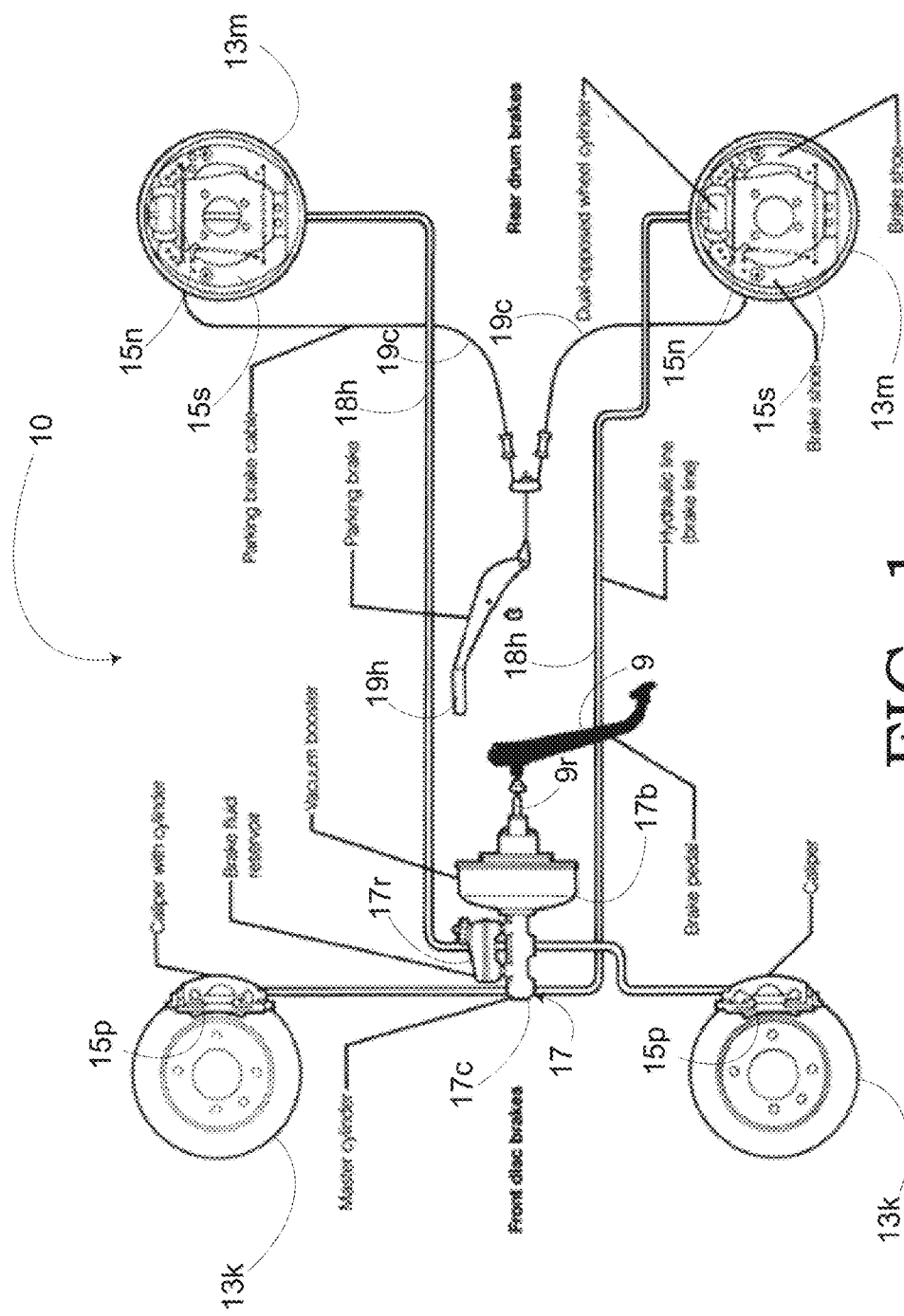
FIG. 1 depicts a prior art hydraulic braking system.

Before discussing the operation of the inventive system, an overview of two conventional and distinct braking systems generally employed in towing vehicles is appropriate. The first of these is the hydraulic system which is often found not only in the towing vehicle but also in the towed vehicle or dinghy. Such a hydraulic system 10 is portrayed in FIG. 1. While shown with both disk brakes 13k and drum brakes 13m, this hydraulic system is typical of cars available in the 1980s and later of a class that might be used for either towing or as a towed vehicle. Later vehicles exclusively employ disk brakes and earlier vehicles, exclusively drums. In this system, the wheel is attached to the dram. There are brake shoes which the system 10 uses to contact either of a rotating drum 13m or rotating disk 13k either of which is fixedly attached to its corresponding wheel when a brake pedal 9 is depressed by the driver. The shoes slow rotation by driving a lining on an outer surface of the brake shoe against either the rotating drum 13m or the rotating disk 13k thereby employing friction at the outer surface to stop the rotation.

Hydraulic brakes make use of hydraulic pressure to force brake shoes outwards against the brake dram 13m or to grasp the disk 13k by employing Pascal's law or the principle of transmission of fluid-pressure. In fluid mechanics, pressure exerted anywhere in a confined incompressible fluid is transmitted equally in all directions throughout the fluid such that the pressure variations (initial differences) remain the same. The law was established by French mathematician Blaise Pascal and bears his name.

The brake pedal 9 exerts a pressure on the rod 9r which propels a piston down a cylinder known as the master cylinder 17c (shown as a part of the master cylinder assembly 17) exerting that pressure against a volume of hydraulic fluid. The fluid pressure is conveyed from the master cylinder 17c through the hydraulic lines 18h to either the calipers 15p or to each of the brake cylinders 15n, in either case urging the brake surfaces against either the drams 13m or the rotors 13k. Clamping onto the drams 13m or the rotors 13k exerts the slowing influence upon each of the wheels in turn.

When the driver releases the brake pedal 9, the piston in the master cylinder 17c returns to its original position due to the pressure the return spring exerts. Thus, the pistons in the wheel cylinder come back in its original inward position. As the piston returns to its rest position, Pascal's Law exerts its converse result, the pressure in the individual brake cylinders 15n and brake calipers 15p drops equally releasing the grip on each of the drums 13m and the rotors 13k releasing the wheels to rotate freely. Reversing the movement of the calipers when the brakes were applied, the drop in fluid pressure causes the calipers to retract and the brakes are released.

As discussed above, a vacuum booster 17b multiplies the pressure asserted on the hydraulic fluid to increase the efficiency of the brakes. The vacuum booster 17b was invented in 1927 to provide a shorter stopping distance with less effort. The booster 17b works by pulling the air out of the booster chamber with a pump creating a low-pressure system relative to the ambient atmospheric pressure. When the driver steps on the brake pedal, the input rod on the booster is pushed in which lets atmospheric pressure into the booster. This, in turn, pushes the diaphragm toward the master cylinder. The diaphragm, then, at sea level adds pressure to the piston across the surface of about 15 pounds per square inch, at sea level, across the diaphragm. To do this, however, it is necessary to evacuate the chamber on the opposite side of the diaphragm, otherwise, the pressures being equal, there is no differential in pressure and no assistance upon application of pressure on the brake pedal. Generally, the intake manifold of a running engine is used as a very good source of vacuum for this purpose.

Figure 2:
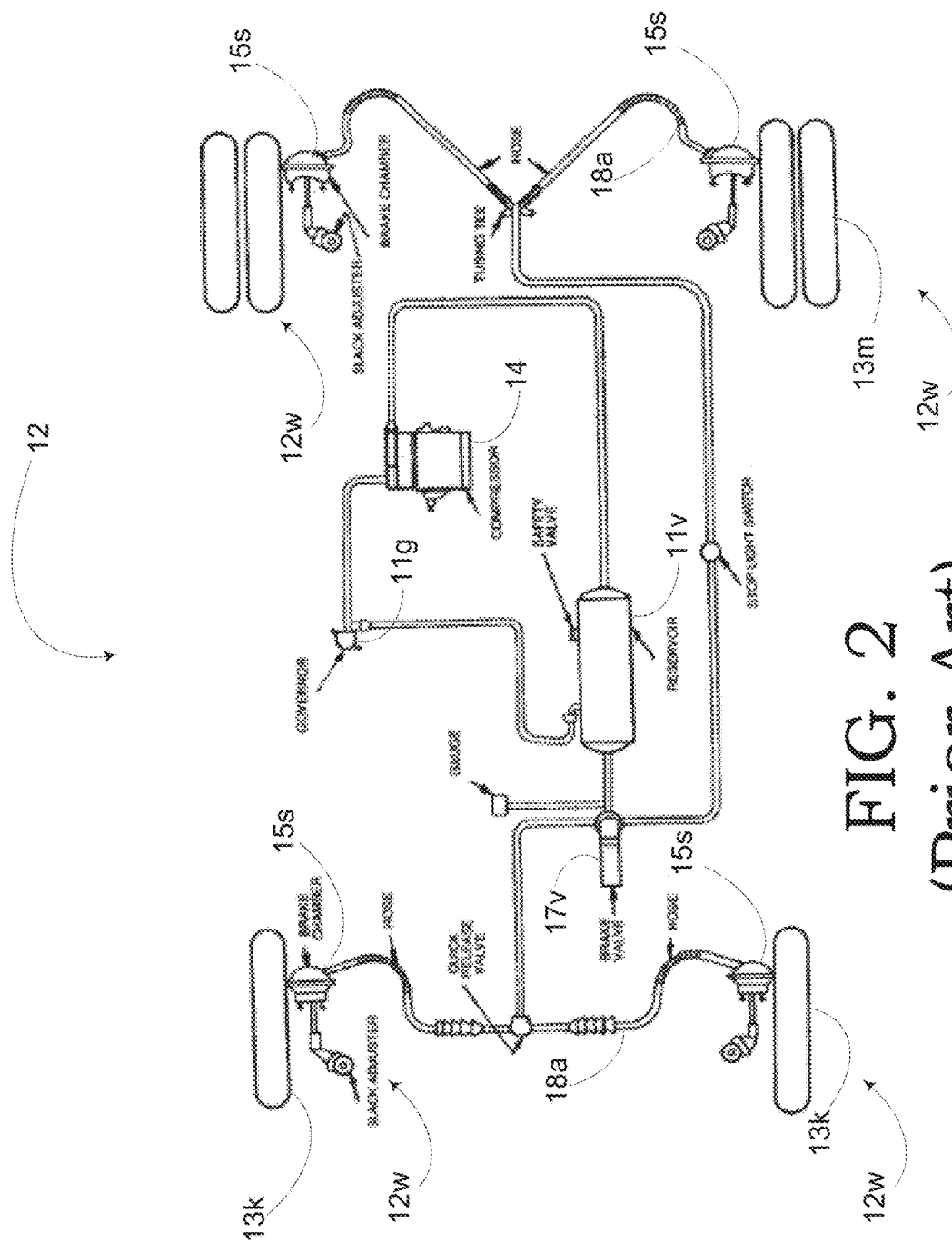
FIG. 2 depicts a prior art air braking system.

FIG. 2 portrays an alternate embodiment of a prior art braking system is known is commonly as an air brake system 12. The air brake system 12 consists of a two-stage air-compressor 14 driven either by the crankshaft or gearbox shaft. The compressor 14 takes air from ambient atmosphere, compresses it and delivers the compressed air to an air reservoir 11v through un-loader valve or governor 11g. Where the pressure within the reservoir 11v reaches the maximum degree, the un-loader valve 11g opens to the atmosphere. Then the compressed air is ported to the atmosphere directly to maintain the pressure within the reservoir 11v at a selected operating pressure.

Each of the four wheels fitted with brake chambers 15s consists of a distinct diaphragm, and to which compressed air from the reservoir is applied through a brake valve 17v to apply a clamping force to the drums 13m and the rotors 13k in a manner similar to that of the hydraulic brakes set forth above. Specifically, the diaphragm in each brake chamber 15s exerts a force on a cam actuating lever (not shown) and applies the brake. Each of the brake chambers 15s is connected to the reservoir through a valve 17v, itself responsive to a brake pedal.

When the brake pedal (not shown) is pushed the brake valve 17v opens and compressed air can flow from the reservoir 11v to the brake chamber 15s. The brake valve 17v consists of three passages communicating, respectively to each of an:
1. Air intake;
2. Exhaust; and
3. a Brake chamber.

When the brake pedal is pressed, the exhaust passage will be closed and the air intake passage open allowing the compressed air to go back to the chamber 15s. During a return stroke, the exhaust passage opens while the air intake closes, and exhaust air is ported to the atmosphere. This system is generally fitted with an emergency mechanical brake, which can be used when air supply fails the air brake system 12.

An air brake system 12 is used in heavy vehicles because air brakes can assert a greater frictional force than either hydraulic or mechanical brakes. Additionally, because the components except for the brake valve 17v and the rotors 13k or drums 13m, can be placed anywhere within the vehicle body, use of air brakes simplifies the chassis design. Finally, because the reservoir is generally sized with a sufficient margin for exigencies, it can also supply compressed air for other needs such as tire inflation, to activate a horn, to drive windscreen wipers and other such needs such as inflating a buffer to support a driver's seat. Naturally, because the air brake system 12 relies upon the presence of pressure within the reservoir 11v, preventing, detecting, locating, and repairing leaks within the system is a critical task in maintenance.

Having reviewed conventional braking systems present in either of towing vehicle systems, the discussion moves on to one of the primary elements of an inventive supplemental braking system. Unlike conventional direct systems (as described above in the Background) which seek to employ pressure in either of the hydraulic or compressed air lines to mechanically move a piston in an actuator, the inventive system relies, instead upon sensing pressure within a brake line without a corresponding movement of a piston increasing the necessary volume of braking fluid to actuate the brakes, be that fluid either air or hydraulic fluid. A purely mechanical connection such as that used in a direct system as described above, draws off a significant volume of hydraulic fluid as the piston is motivated down the cylinder of the actuator.

Figure 3:
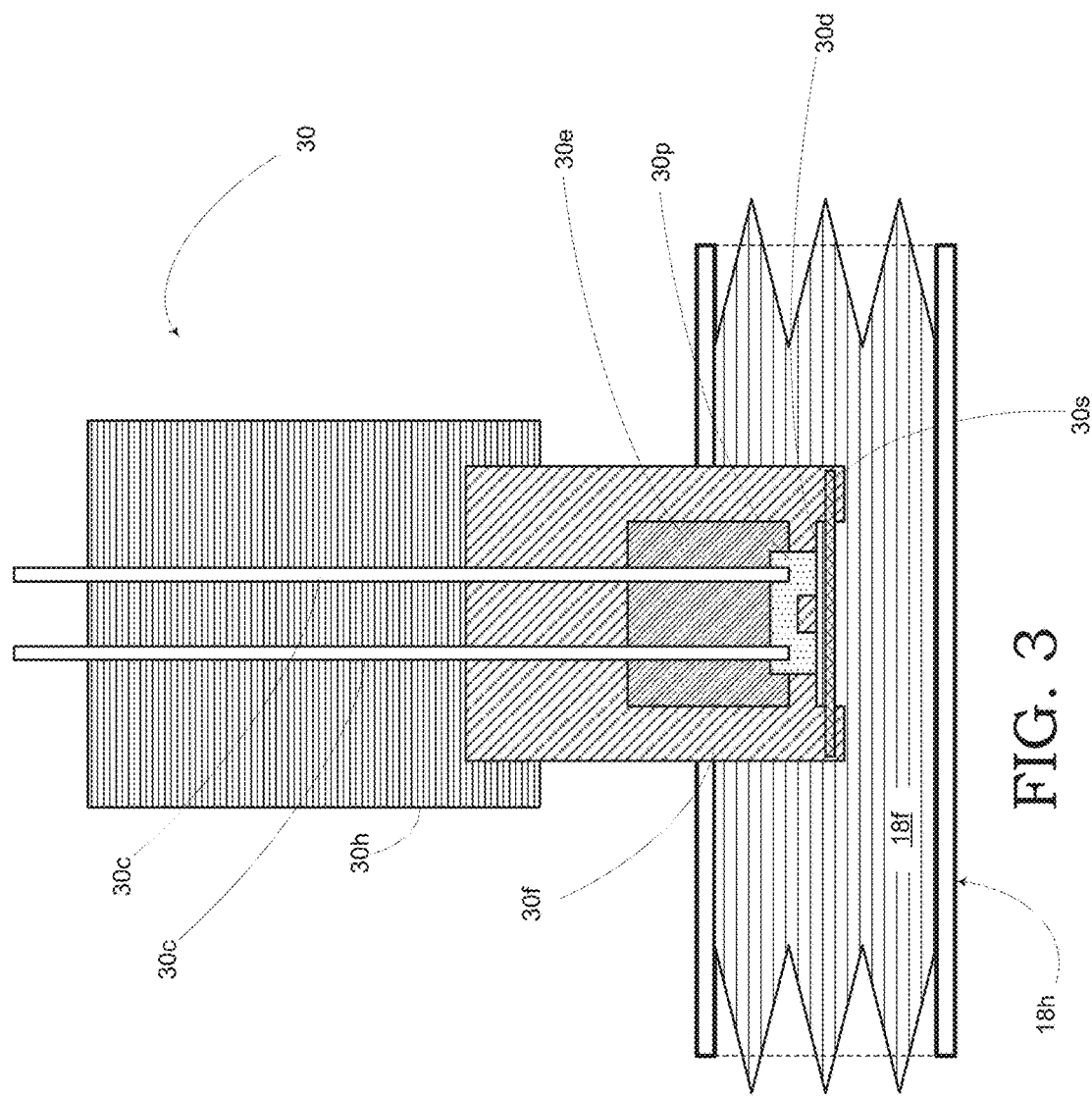
FIG. 3 depicts a piezoresistor for mounting within a braking circuit of a towing vehicle to sense a braking pressure of braking fluid contained therein.

To sense fluid pressure in either of the above-described hydraulic (FIG. 1) or air (FIG. 2) braking systems, the inventive system employs a piezoresistive silicon devices which measures the stress detected in a semiconductor as exerted by the braking fluid. As shown in FIG. 3, a pressure sensor 30, in its preferred embodiment is a piezoresistive silicon device installed as a fitting within either of a hydraulic line 18h (FIG. 1) or an air braking line 18a (FIG. 2) contain a braking fluid (air or hydraulic fluid) 18f. As shown, the sensor includes a fitting body 30f (either brazed or threaded into the line 18h). Electrical conductors 30c pass through a sensor housing 30h mounted on the fitting 30f. These conductors 30c are generally potted in an inert substance 30p such as, for example, epoxy. A piezoresistive semiconductor 30p is mounted at the base of the fitting in contact with a plate 30d. In a preferred embodiment, a protective screen 30s is mounted to allow pressure to reach the diaphragm plate 30d without allowing debris to collect within a cavity defined by the interspace between the screen 30s and the diaphragm plate 30d.

The piezoresistive effect involves pressure or stress. In a piezoresistive pressure sensor, a piezoresistor is usually implanted in the surface of a thin silicon diaphragm. To understand the effect, imagine the piezoresistive semiconductor 30p as a portion of a skin of a balloon. As greater pressure is applied to that skin to inflate the balloon, the matrix of the semiconductor 30p is stretched and the resulting strain impacts the carrier mobility and number density. Because electrons that travel these paths must travel further with fewer carriers per unit volume, the resistance of the semiconductor rises as the strain increases. Thus, by knowing the relationship between the pressure acting on the diaphragm plate 30d and the resulting resistance between the electrical conductors 30c, a measured resistance can result in a derived pressure within the lines.

In most instrumentation applications, semiconductors generate either a potential or voltage between two conductors 30c. Such a measured charge or voltage is relatively easy to employ in a sensor. In the case of piezoresistive semiconductors 30p, however, changes in resistance across the piezo material is the product, and can only be measured as a current change while a reference voltage is placed across the two conductors 30c, i.e. Ohm's law. The current in a circuit is directly proportional to the electric potential difference impressed across its ends and inversely proportional to the total resistance offered by the external circuit. Thus, to measure pressure applied across a surface of the piezoresistive semiconductor 30p, one must measure a change in the current through the piezoresistive semiconductor 30p due to a change in electrical resistance.

Valued for their high sensitivity and linearity, piezoresistive pressure sensors were some of the first MEMS devices to come to market. Various industries implement these devices in their products to measure pressure. For example, the biomedical field uses piezoresistive sensors as tools to measure blood pressure, while the automotive industry uses them to gauge oil and gas levels in car engines. These industries favor the use of piezoresistive sensors 30 because of the ability to measure pressure over a wide range without any resulting change in volume of the system being measured. The insignificant volume change is possible because such deformation of the piezoresistive semiconductor 30p due to pressure is insignificant when compared to the operating volume.

Using a piezoresistive pressure sensor 30 assures that the observer effect is minimized. In science, the term "observer effect" refers to changes that the act of observation will make upon the phenomenon being observed. This is often the result of instruments that, by necessity, alter the state of what they measure in some manner. A commonplace example is checking the pressure in an automobile tire; this is difficult to do without letting out some of the air, thus changing the pressure. This effect can be observed in many domains of physics and can often be reduced to insignificance by using better instruments or observation techniques. In this case, the deformation of the piezoresistive semiconductor 30p requires only the very slightest change in the volume of the towing vehicle's brake system and thus, monitoring the pressure in the towing vehicle's braking system has an infinitesimal effect on the towing vehicle braking efficiency.

Figure 4:
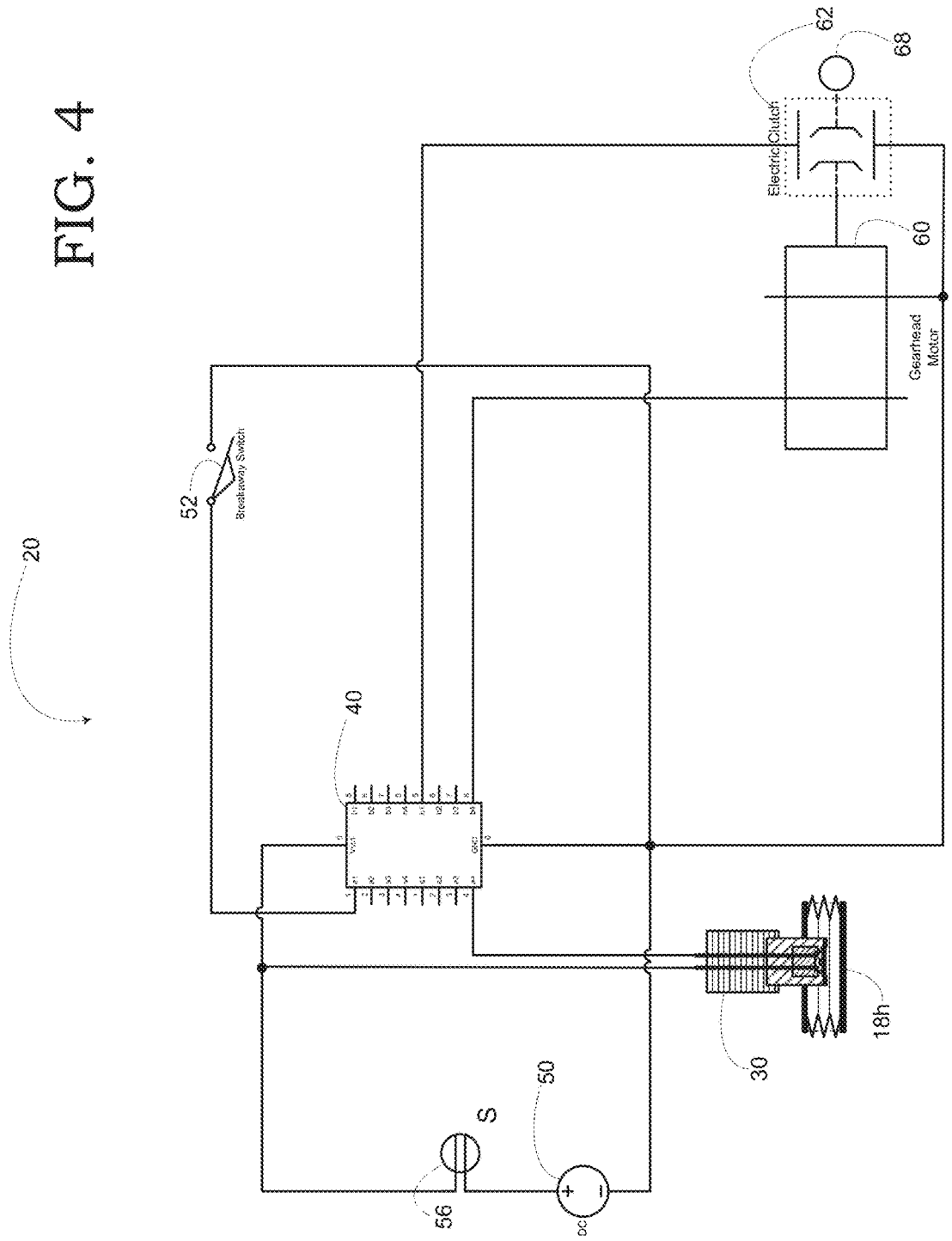
FIG. 4 is an exemplary block diagram depicting an inventive supplemental braking system.

FIG. 4 portrays the electronic and electrical system employed in the preferred embodiment of the invention. Shown are both hydraulic fluid 18h in the line and the pressure sensor 30. The pressure sensor 30 in its piezoresistive embodiment exists in the system 20 as a variable resistor. A resistor has no polarity and will present the same resistance to current flowing in either direction. The resistance is the same regardless of the orientation of the probes across it. For that reason, the conductors 30c (FIG. 3) are defined as the negative terminal (low potential) or the positive (high potential) terminal as placed the circuit which comprises the pressure sensor 30.

The preferred embodiment of the supplemental braking system 20 is designed to be powered from a 12-volt DC source. Nearly all modern automobiles have a 12-volt DC electrical system and, in the preferred embodiment, the system is powered by the electrical system of either of the towed or the towing vehicle, in most instances, the towing vehicle. A voltage regulator within the vehicle supplying that voltage regulates the charging voltage that an alternator the vehicle's engine drives produces. Generally, the voltage regulator keeps the vehicle voltage between 13.5 and 14.5 volts to protect the electrical components throughout the vehicle. A second voltage regulator is interposed between the vehicle electrical system and the supplemental braking system 20 to condition the output as a power source for computer logic. The output of the second voltage regulator is shown as a DC source 50.

Extending from the ground side of the DC source 50, the circuit includes a ground provided to each of a breakaway switch 52, a control board 40, a gearhead motor 60 and an electric clutch 62. The positive side of the DC source 50 is connected to a master switch 56. In its closed position, the master switch 56 provides potential and current to the whole of the system 20. The system 20 includes, as well, the pressure sensor 30, the control board 40, the gearhead motor 60 and the electric clutch 62 each receiving power from the DC source 50.

A gearhead motor is an electric motor that includes a reduction gear cluster or gearhead to drive an output shaft. The gearhead was mainly used to change the motor speed and as a torque amplifier. With the introduction of motors incorporating speed control functions, the primary role of the gearhead is to amplify torque. The gearhead in embodiments of the invention also the torque necessary to drive the motor backwards. The gearhead motor functions as a "one-way" rotational device.

Throughout this teaching, there exists a mechanical connection between the gearhead motor and the towed vehicle brake pedal which will be referred to as a "cable." The term "cable" as used here is more inclusive than in its standard definition, i.e. "a thick rope of wire or nonmetallic fiber, typically used for construction, mooring ships, and towing vehicles," As used herein, it would also include the broader definition "a band of tough flexible material for transmitting motion and power" and would include, for example, a molded and flexible Nylon™ tie rod or any linkage effective to draw down the brake pedal actuating the brake. In a preferred embodiment, the "cable" refers to a flexible nylon rack that is retracted by rotation of a pinion gear affixed to the output shaft of the gearhead motor.

The control board 40 drives each of the gearhead motor 60 and the electric clutch 62 and traces to each are shown exiting from contacts on the right-hand side of the symbol representing the control board 40 in FIG. 4. In an alternate embodiment, relays might be used. Relays are used in electrical circuits to isolate and protect logical circuits from high current draw which might burn smaller conductive paths. Instead, a relay will, when activated, act as a closed switch allowing current to flow in a second circuit. Relays used as electronic controls or in switching circuits either may be mounted directly onto PCB boards such as the control board 40 or connected as free standing devices. Relays are selected according to the current they are to accommodate on the switched side which load currents are normally expressed in values ranging from fractions of an ampere up to 20+ amperes. While simplified in this diagram, prudent design will generally prevent large current volumes from passing through the control board 40 and it is the intent of the inventor that this instant description will include any such prudent designs. The rudiments of each are adequately portrayed in this FIG. 4 such that the operation of the inventive device can be understood. Also, while relays are described herein, the presently preferred embodiment accommodates this function with solid state switching devices having equivalent capacities.

The control board receives two input signals. The first such signal is from the pressure sensor 30, and the other signal is from a normally open contact switch, the breakaway switch 52. These two input signals are used to drive each of the gearhead motor 60 and the electric clutch 62 in two different modes of operation as is listed below.

The easier of the two modes to understand is that known as the "breakaway mode". State laws vary, but some states require a stopping ability within a specified distance from a stated speed, and many require a "break-away" brake for situations where in response to the towed vehicle becoming unhitched, the towed vehicle will brake to slow at its practical maximum rate to prevent run away of the towed vehicle. At 49 CFR § 393.43 entitled "Breakaway and emergency braking", the Code of Federal Regulations states "(a) Towing vehicle protection system. Every motor vehicle, if used to tow a trailer equipped with brakes, shall be equipped with a means, in the case of a breakaway of the trailer, to activate the service brakes on the towing vehicle and stopping the towing vehicle."

The normally open contact switch 52, then, is like a dead man's switch. In a preferred embodiment of the breakaway switch 52 is the Tekonsha™ described as a "[c]ompletely sealed breakaway switches to automatically set trailer brakes in case of accidental trailer breakaway," The Tekonsha™ switch comprises two contacts urged together by spring mounts. A wire rope extending from the towed vehicle terminates in a strip of insulating material that is interposed between the contacts. As such, the contacts are held apart so long as the strip is between them. When the strip is removed by the movement of the towed vehicle away from the towing vehicle, the contacts connect completing a circuit. The flow of current through the switch sends a signal indicative of a "breakaway."

In a second embodiment, a wire rope extending from the towing vehicle to the towed vehicle terminates in a strong magnet, for example, a neodymium magnet. The breakaway switch 52, in this preferred embodiment is a magnetic reed switch which closes under the influence of the magnetic field surrounding the neodymium magnet. Therefore, using a ferrous plate on the front of the towed vehicle to support the normally open contact breakaway switch 52, the cable can readily be affixed so that in normal towing the switch remains closed and the control board 40 senses a closed circuit enabling normal operation. Should the towed vehicle separate from the towing vehicle, presumptively the cable will part at the plate with the magnet remaining affixed to the cable and thus to the towing vehicle. Removing the magnet allows the switch to open and the control board senses the fault as indicative of a "breakaway."

In either embodiment, upon sensing a "breakaway," the control board then applies the brakes in the towed vehicle in accord using the clutch 62 and the motor 60 as described below. Thus, the inventive system complies with regulatory and prudential requirements, bringing the towed vehicle to a complete stop in the event of a breakaway. In the preferred embodiment, a "shortest stopping distance" of towed vehicle brake application sequence is known to the controller or stored in nonvolatile memory therein and applied in any instance of "breakaway."

The second mode is the operating state or mode. While in operating mode (any time that the breakaway switch is in its operating as opposed to "breakaway" mode) the braking of the towing vehicle determines the behavior of the towed vehicle. Naturally, if a supplemental braking system applies too little braking relative to the braking applied by the towing vehicle, the towed vehicle wants to overran the towing vehicle causing undue brake pad wear on the towing vehicle. If, on the other hand, the towed vehicle applies more braking than would be appropriate for the towing vehicle, the towed vehicle acts as an anchor or drogue and the excess friction unduly wears the brake pads of the towed vehicle. It is the objective, then, of any supplemental braking system, to provide an exact amount of braking on the towed vehicle to reflect the braking applied at the driver's behest in the towing vehicle. In each case, applying brakes at a selected pressure for a selected duration in the towing vehicle ought to result in a specific braking application in the towed vehicle.

In the prior art, the relationship between the application of brakes in the towed vehicle is a mechanical function derived from one of three possible inputs:

1) Mechanical movement of a piston in the towing vehicle's braking system;
2) Sensed acceleration (accelerometers, pendulums, etc.) in the towing vehicle; and
3) Surge-type braking based upon extension and compaction of a towing yoke.

Each of these systems uses a relatively linear response curve to apply brakes at the pedal of the towed vehicle in rough proportion to movement of a sensing device, for example, a pendulum in an accelerometer or a piston in a proportionate system. While never perfect at the balance between towing braking and towed braking, each system has could roughly approximate an appropriate balance between a towed and towing vehicle. Advantageously, the instant system 20 can be more appropriately configured to optimally brake the towed vehicle assuring better control and much less wear on either of the towed or towing vehicle braking systems.

Because the selected response to each sensed pressure in the towed vehicle system, can be optimally selected, i.e. selected to address the decelerative state of the towing vehicle, a perfect balance of braking between the two vehicles is always struck. In one embodiment of the system, there is a simple coefficient stored that relates braking performance in the towed vehicle to sense fluid pressure in the towing vehicle. In many cases this is a very useful embodiment.

In a simplest embodiment of the braking system, braking characteristics of the towed vehicle are known and a single coefficient is appropriate to select a braking pressure used in response to a sensed pressure in the towing vehicle brake lines at the pressure sensor 30 and the response or responses to that sensed pressure are "hard coded" into software or firmware to dictate how the motor 60 will respond to that sensed pressure. In such an embodiment, the response is linear, which is to say that the braking pressure exerted on the brake pedal is proportionate to the sensed pressure.

In another embodiment, each increment of sensed pressure is associated with a coefficient stored in the system and that coefficient is used to determine the cable travel the system will implement in response to that sensed pressure. No linear or even curvilinear construct binds this embodiment of the system. A look-up table informs each response to any sensed pressure at the pressure sensor 30.

In computer science, a lookup table is an array that replaces runtime computation with a simpler array indexing operation, i.e. rather than to calculate a value based upon sensed pressure at the pressure sensor 30, the system 20 simply recalls a previously selected value. The savings in terms of processing time can be significant, since retrieving a value from memory is often faster than undergoing an "expensive" computation or input/output operation. The tables may be precalculated and stored in static program storage, calculated (or "pre-fetched") as part of a program's initialization phase (memoization—in computing, memoization is an optimization technique used primarily to speed up computer programs by storing the results of expensive function calls and returning the cached result when the same inputs occur again.), or even stored in hardware in application-specific platforms. Lookup tables are also used extensively to validate input values by matching against a list of valid (or invalid) items in an array and, in some programming languages, may include pointer functions (or offsets to labels) to process the matching input.

In a further embodiment, the braking of the towed vehicle benefits from a vacuum assist or power-assist braking function in the towed vehicle. When the dinghy or towed vehicle is in normal operation, the engine, while running, draws large volumes of air into its cylinders to supply oxygen to the combustion of fuel therein. A port near the intake uses that movement of air into the engine to induce a vacuum which can be stored in a vacuum reservoir, essentially an empty air-tight chamber. The reservoir is used to evacuate a chamber on one side of a diaphragm. On the opposite side of the diaphragm, a progressive valve admits atmospheric pressure in proportion to the movement of the brake pedal thereby multiplying the pressure exerted to move a piston in the master cylinder to apply a braking force at the wheels.

Typically, without the engine running, there is no vacuum to evacuate the chamber on the one side of the diaphragm relative to atmospheric pressure. Thus, the power-assist feature does not function when the towed vehicle's engine is off. An active braking system taps into a separate vacuum source to supply the vacuum used to evacuate the chamber on the sealed side of the diaphragm. The supplied vacuum enables the power-assisted braking capability in the dinghy just as though the engine were running. Using either of the towing vehicle's own generated vacuum or an electric vacuum pump to supply a vacuum enables the power-assist braking function of the dinghy to function just as though its own engine was running.

Thus, in operation of the preferred embodiment, with the breakaway switch 52 in its operational state and the master switch 56 in a closed state, the sensed pressure at the pressure sensor 30 will evoke a specific and selected response by application of brakes at the pedal of the towed vehicle for a specific duration and pressure designated within the look-up table. Pressure is applied to the brake pedal 9 (FIG. 5) of the towed vehicle in accord with the values retrieved from the look-up table displacing the brake pedal 9 in a manner very like an operator depressing that pedal 9. The control board 40 assures that depressing a brake pedal in the towing vehicle would increase the fluid 18*h* according to Pascal's law as described above. In response, the sensor 30 will diminish a current flowing to the control board 40 in proportion to the sensed pressure at the sensor 30. Sensing the diminution of current, the control board looks up a response dictated based upon the sensed pressure. Then signals are sent to each of the motor and the clutch, in turn, in accord with the looked-up response.

The control board 40 controls the electric motor 60 and clutch 62 in applying pressure to the brake pedal 9 in operation. In the preferred embodiment, the pressure range of the sensor is user-selectable to allow for use on either of a hydraulic or air-based braking system. To facilitate this user-selectable operation, the control board 40 optionally includes either of a hardware or software means to switch the scale of input from the pressure sensor 30, to select ranges of, for example, from 0 to 125 psi or 0 to 3000 psi as an operating range. Once a range is set, the values retrieved will be appropriate for the braking means of the towing vehicle. The clutch 62 and motor 60 will receive signals based upon the sensed pressure and the type of braking system of the towing vehicle.

Generally, the values that a manufacturer might designate in the look-up table are within a range that will provide superior results to other systems independent of the knowledge as to the make and model of each of the towing and towed vehicles. Vehicles selected as a "dinghy" fall within a weight group and might have similar braking characteristics. A Ford Escape™, Subaru Forester™, Honda CRV™ and a Toyota RAV4 may not differ so much in their braking characteristics such that distinct values are necessary to approximate optimal braking results. In at least one embodiment, families of "dinghies" having similar weight, weight distribution, and braking performance might be represented by a single set of values.

In another embodiment, the selected values are merely starting points as elements of a dynamic look-up table. In one further embodiment, accelerometers are placed in each of the to wing and towed vehicles to determine the deceleration of each upon braking. Using an iterative application of artificial intelligence, these values can be refined to achieve maximum braking effect at each of the wheels of both towed and towing vehicles. Indeed, in such an embodiment, the accelerometers might include x- and y-axis measurements to allow for distinct values for straight-line braking and for braking to either of the left or right directions. Markov decision processes provide a useful framework for solving for optimal braking by applying sequential decision making under uncertainty. Relative to some Important environment variables, i.e. state of the road surface and condition of the tires, decisions on partial information about the system state. Thus, a dynamic lookup table is populated on an iterative basis using the more general framework of partially observable Markov decision processes. By changing the coefficients and observing the sensed deceleration at the sensors, a controller can iteratively "zero in" on optimal values with which it will populate the dynamic lookup table. However, having a dynamic look-up table is not essential to the invention and in most instances of the invention, the values for braking will be designated at the time of sale to remain static in use.

In a further embodiment of the braking system, the Markov decision processes are further informed by a set of temperature sensors located at the calipers of the brakes in the towed vehicle. Since brake heat energy is only related to the amount of kinetic energy being converted, it doesn't matter whether the brakes are applied hard for a short time or light for a long time, the resulting heat will be the same if the desired speed reduction is the same. If all the brakes on a vehicle are generating the same amount of brake torque, the heat created by converting kinetic energy will be evenly distributed through all the brakes. However, imbalance caused by poor maintenance, poor load distribution, or light brake applications may cause an uneven distribution of brake heat with some brakes possibly overheating. The typical generic "normal driving" temperature range for well-balanced vehicle brakes is 100 to 200 degrees. A controlled mountain grade descent can produce brake temperatures between 200 and 400 degrees.

Brake system heat is dissipated through radiation, conduction, and convection due to a temperature gradient. Radiation is the transfer of heat through space. Conduction is the transfer of heat to parts of the brake system and other attached vehicle parts. Convection is the transfer of heat from the brake to the air moving across the brake. Because of the limits on how quickly heat energy can be dissipated through radiation, conduction, and convection, a brake system can sometimes build up heat faster than it can be removed. This imbalance between the heat coming into the system and the heat leaving the system is referred to as saturation. If this imbalance persists and the system's heat builds up to certain temperature thresholds, then brake fade can occur. The temperature thresholds for brake fade vary depending on the brake system and the category of the fade experienced. Nonetheless, the brake performance of the towed vehicle can be further optimized in a dynamic lookup table by Markov decision processes observing each of acceleration and temperature to achieve optimum braking towed vehicle relative to the towing vehicle.

In a further embodiment, these same sensors can trigger any of a light, warning sound or both or to drive a gauge to inform the driver as to temperature and its concurrent effect upon braking efficiency. Just as with coolant temperature, it is extremely advantageous to supply information to the driver of the towed vehicle. Where extreme temperatures are detected, a signal might indicate the need for the drive of the towed vehicle to stop and inspect the towed vehicle for an indicated malfunction of the towed vehicle braking system.

Figure 5:
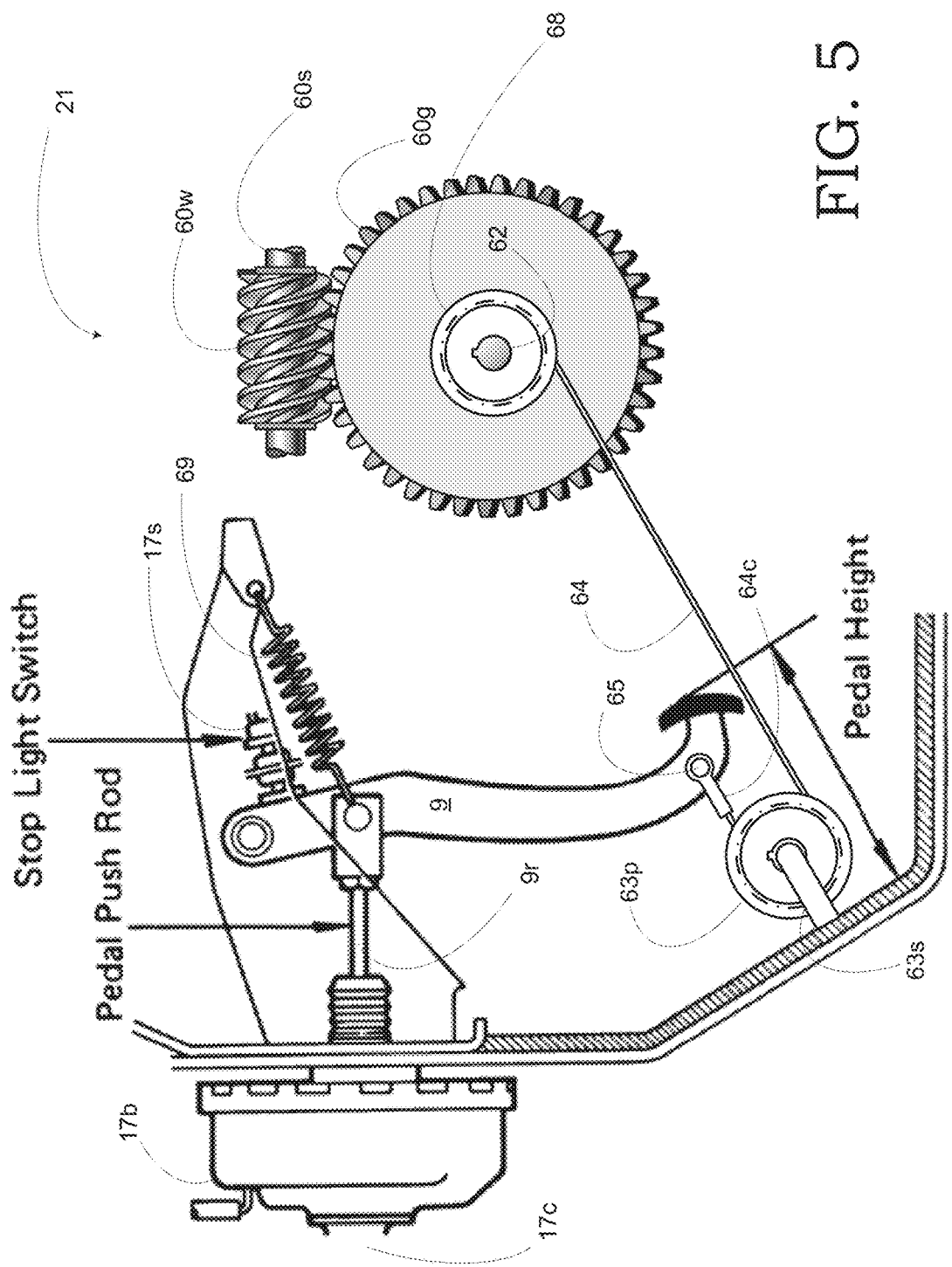
FIG. 5 is an exemplary block diagram depicting a motor capstan assembly activated by the inventive supplemental braking system in connection with braking system of the towed vehicle.

In FIG. 5, a simplified diagram of the mechanism for placing pressure on the to wed vehicle's brake pedal 9 is shown. In the presently preferred embodiment, a pulley 63*p* is attached to a floor pan of the towed vehicle while the motor 60 (FIG. 4) is placed at a fixed point such as on the floor pan at a forward edge of a driver's seat. A cable 64 terminates at a clevis 65 attached to the brake pedal 9. (For the purposes of this explanation, the term cable is used. As expressed above, it is the inventor's intent that what is expressed as cable herein includes any relatively long narrow strip of pliant material might be used. Therefore, what this specification labels as cable might be a chain, a metal ribbon such as that of a mainspring, a webbing strap such as of Nylon™, or a polyester webbing strap, a wire-rope, a Kevlar™ line, or any such similar structure including, as expressed above a Nylon™ toothed rack mating with a toothed capstan 68. Importantly, when the inventor uses the term "cable" that structure is not merely a limited to a wire rope.) From the pedal 9, the cable 64 passes over a pulley 63*p* sheave (held to the floor pan by a sheave cheek stanchion 63*s*) and onto a reel of a capstan 68 which, alternately, pays out and takes up the cable 64. When the capstan 68 takes up the cable 64 winding it about the reel, the movement of the cable 64 acts to draw the pedal 9 downward, thereby engaging the brakes in the towed vehicle. When the capstan 68 is allowed to freewheel, the pressure exerted by the return spring pulls the pedal 9 back up to its full pedal height drawing the cable 64 back through the pulley 63*p* causing the capstan 68 to pay out the cable 64 to an "at rest" position.

To cause the capstan 68 to take up the cable 64, an electric motor (not shown, 60 in FIG. 4) is used. Because, in the preferred embodiment a reduction such as the worm screw 60*w* and worm wheel 60*g* arrangement such as that shown, is used to greatly increase the torque turning the capstan 68, the worm wheel 60*g* only spins with input from the motor input shaft. Unlike ordinary gear trains, the direction of transmission (input shaft vs output shaft) is not reversible when using large reduction ratios. Due to the greater friction involved between the worm screw 60*w* and worm-wheel 60*g*, especially when usually a single start (one spiral) worm, there is a ratcheting effect when the motor 60 (in FIG. 4) applies torque to the capstan 68. This can be an ad vantage when it is desired to eliminate any possibility of the output driving the input. Something is needed to decouple the capstan 68 from the worm wheel 60*g* to enable the pay out of the cable 64.

In the preferred embodiment, an electromagnetic clutch 62 (FIG. 4) is interposed to allow the capstan 68 to freewheel paying out the cable 64. Electromagnetic clutches operate electrically but transmit torque mechanically. Therefore, they used to be referred to as electro-mechanical clutches. When the control board 40 (FIG. 4) sends a current to actuate the clutch 68, that current flows through the electromagnet producing a magnetic field. A rotor portion of the clutch attached to the capstan 68 becomes magnetized and sets up a magnetic loop that attracts an armature attached to the worm wheel 60*g*. The armature is pulled against the rotor and a frictional force is generated where they contact thereby locking the capstan 68 to the worm wheel 60g. Within a relatively short time, the capstan 68 is accelerated to match the speed of the worm wheel 60g. If the motor 60 is spinning, engagement of the clutch 62 will cause the capstan 68 to take up cable 64 drawing the brake pedal 9 through its pedal height toward the floor pan. When the clutch 62 (FIG. 4) stops receiving the current from the control board 40, the capstan 68 is tree to rotate and the force the return spring 69 exerts draws the cable 64 back off of the capstan 68 to an "at rest" position. In this manner, the system 20 (FIG. 4) can activate and release the brakes in the towed vehicle.

It is important here to point out that apart from the exploitation of a cable to draw the pedal down, there is nothing about this configuration of pulley 63p and cable 64 that is necessary to effect the ends of the invention. Alternate embodiments include the mounting of the motor 60, clutch 62 and capstan 68 on the floor pan itself to draw the pedal downward without the use of a pulley 63p. In FIG. 5, the alternate embodiment would place the capstan 68 and worm wheel 60g where the pulley 30p and the stanchion 63s are shown.

Still another embodiment would obviate the pulley 63p by use a Bowden cable and fixture point, placing the motor remotely. A Bowden cable is a type of flexible cable used to transmit mechanical force or energy by the movement of an inner cable relative to a hollow outer cable housing. The housing is generally of composite construction, consisting of an inner lining, a longitudinally incompressible layer such as a helical winding or a sheaf of steel wire, and a protective outer covering. Examples of such Bowden cables are as used for gear shift cables on bicycles and throttle cables on motorcycles. Usually provision is made for adjusting the cable tension using an inline hollow bolt (often called a "barrel adjuster"), which lengthens or shortens the cable housing relative to a fixed anchor point. Lengthening the housing (turning the barrel adjuster out) tightens the cable; shortening the housing (turning the barrel adjuster in) loosens the cable.

Thus, by placing the fixed anchor point at the pulley stanchion 63s, the motor 60, clutch 62 and capstan 68 could draw down the brake pedal 9 located remotely from fixed anchor point such as being mounted on the engine firewall. The only important aspect to the configuration of the cable 64 is that when the control board 40 sends current to the clutch 62, such that the motor 60 drives the capstan 68 for a calculated time frame to effect the longitudinal translation of the cable 64 drawing the pedal 9 downward through its pedal height causing the towed vehicle to brake.

Thus far, it is understood that the control board 40 exploits a pressure sensor 30 to sense pressure in the towing vehicle brake lines such that upon application of the brakes in the towing vehicle, the control board 40 sends a current to the clutch 62 and to the motor 60 causing the capstan 68 to take up cable 64 drawing down the brake pedal 9 thereby applying brakes of the towed vehicle. The actual working of the control board 40 is where the advantages of the instant invention make themselves evident.

The control board 40 drives the motor 60. In the preferred embodiment, this motor is a direct current, permanent magnet, brushed electric motor, which has a reputation as the workhorse of small, powered mechanical systems. The presently preferred embodiment the motor 60 is one of a type referred to as a "gearmotor" because coupled to an output shaft of the motor 60 is a transmission or "gearhead." In the case of the preferred embodiment the gearhead comprises the worm screw 60w and the worm wheel 60g portrayed in FIG. 5. Small motors like to spin fast with low torque. The gearing reduces the shaft speed and increases the torque. The four essential facts that dictate the basic properties of a DC motor:

1) For a fixed load, the shaft speed is proportional to the applied voltage;
2) For a fixed voltage, the shaft speed is proportional to the torque load applied to the shaft;
3) The shaft torque is proportional to the applied current, no matter what the voltage; and
4) There is internal electrical resistance and internal mechanical friction.

The motor speed when nothing is impeding rotation of the shaft is called the no-load speed. When a load stops the shaft from turning, such a condition is called "stall". At stall, the amount of torque available is called stall torque. Motors have torque-speed curves. For a fixed input voltage from a battery, the motor speed slows down as it is loaded. With no load on the shaft (free-running), the motor runs at the no-load speed (NLS), the fastest possible speed for that voltage. When the shaft is fully loaded and not allowed to move, the speed is zero and the motor is producing its stall torque (ST), the maximum possible torque. At stall torque, the current drawn out of battery is at its maximum, as is motor heating. Ideally, motors should be operated at stall only for brief periods of time (seconds) to save on batteries and to keep the motor from melting. The term "operating point" indicates the speed the motor will run when driving a specific operating load. As that load changes, the operating point slides up and down the torque-speed curve. Because the torque is at its maximum at stall or zero speed, the clutch 62 can be advantageously used to apply maximum torque to accelerate the capstan 68.

Figure 6:
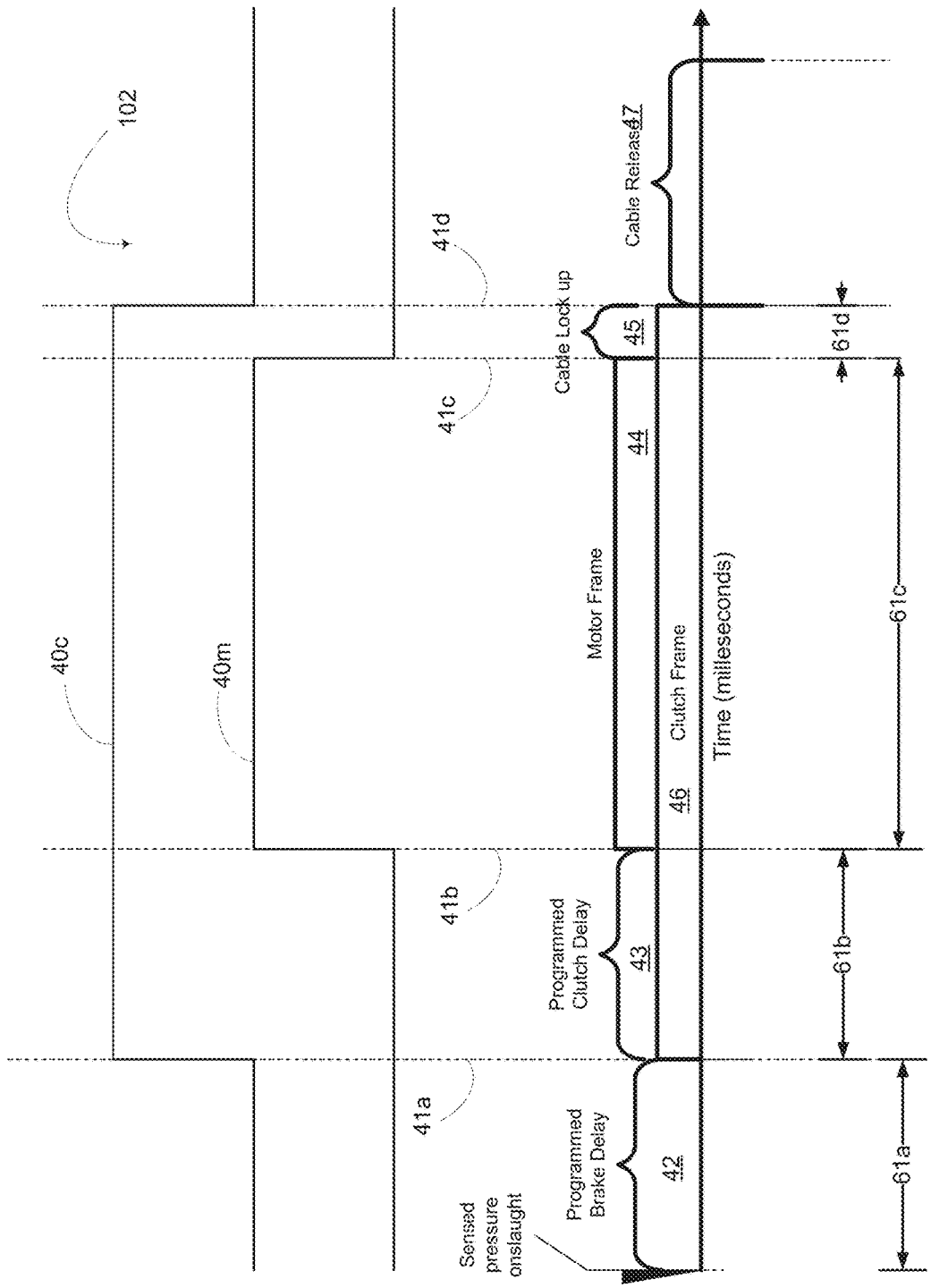
FIG. 6 is a timing diagram for a switching network the inventive supplemental braking system comprises.

FIG. 6 sets forth the two signals the control board 40 sends to the motor 60 (FIG. 4) and the clutch 62 (FIG. 4). The signals shown are simply binary in nature and thus are square waves, i.e. on or off. The duty cycle commences as the pressure sensor senses a pressure in the towing vehicle braking system until, at the end of a configurable first interval 61a, the clutch is engaged at a time 41a shown here as the onset of a "1" on the clutch trace 40c. Then, after a second interval 61b, at a time 41b, the motor trace 40m also advances to a "1" or "on" voltage. A third interval 61c wherein the motor trace 40m and the clutch trace 40c is characterized by the rapid drawing in of the cable moving the brake pedal (shown in FIG. 5) ends at a time 41c where the motor trace 40m drops to "0" shutting off the motor. During this time, the clutch trace 40c continues in the "on" state, locking the movement of the cable in a tensioned state. The locked cable state persists through the duration of a fourth interval 61d terminating at a time 41d when the clutch trace 40c goes to "off" or "zero", disengaging the clutch 62 allowing the cable to ran free. Once the clutch 62 (FIG. 4) disengages at 41e, the capstan 68 (FIG. 5) allows the cable 64 (FIG. 5) to pay back out releasing the pressure on the brake pedal 9 (FIG. 5). As such, such are the five events in a typical duty cycle: The onslaught of pressure in the towing vehicle brake system at 41a; the clutch is engaged at 41b; the motor goes "on" at 41c; the motor goes off at 41d; and the clutch disengaged at 41e.

These five events define six system states of interest. The first of these states is defined by the configurable period of delay between the sensed onslaught of pressure at 41a and the engagement of the clutch at 41b, the interval labeled in FIG. 6 as the "Programmed Brake Delay" 42. The Programmed Brake Delay 42 is a configurable interval between the sensed onslaught of pressure at 41*a* and the lock up of the clutch at 41*b*. This Programmed Brake Delay 42 can be extended from a nearly instantaneous engagement of the clutch 62 (FIG. 4) to engagement several milliseconds later. Drivability of towed/towing vehicle train can often be enhanced by a slight delay in the onset of braking in the towed vehicle. In a preferred embodiment of the instant invention, this value is configurable and can be stored as an integer.

The clutch engages at 41*b* commencing the Clutch Frame or Clutch Engagement Interval. In a preferred embodiment of the invention, there is a configurable variable, the Program Clutch Engagement Time Delay 43. This variable is designated to define a duration of a delay wherein the control board 40 waits (the delay selected to be expressed as an integer defining a number of milliseconds) before activating the clutch at the time 41*a*. By delaying the activation of the clutch to a time 41*a*, the predictability of the behavior of the towing vehicle acting as a unit with its entrained towed vehicle during light braking is improved. The interval wherein the clutch is engaged is termed the Clutch Frame 46 and extends, on each end beyond the interval when the motor is energized, i.e. the Motor Frame 46.

At the expiration of the Program Clutch Engagement Time Delay 43, the Control Board sends a signal, at time 41*c* to apply a DC current to the motor to commence the Motor Frame 44. The duration of the Motor Frame 44 is determined by a value retrieved from the lookup table corresponding to the sensed pressure value, as described above relative to the capstan 68 taking up the cable 64.

When the Motor Frame expires at a time 41*d*, the clutch remains engaged as shown by the Clutch Frame 46 beginning an interval, Cable Lock Up 45. As the clutch remains engaged, the capstan 68 holds the cable 64 in the drawn state while the motor spins down. Because the worm screw 60*w* and worm wheel 60*g* will not allow pressure the brake pedal 9 exerts on the cable 64 to spin the capstan 68 backward to pay out the cable 64, the system continues to hold the brake pedal depressed and the capstan 68 continues to hold that amount of the cable defined by the duration of the Motor Frame 44. As is graphically demonstrated by FIG. 6, the Clutch Frame 46 is the sum of the Programmed Clutch Delay 43, the Motor Frame 44 and the Cable Lock Up 45. At a time 41*d*, the control board 40 terminates the Clutch Frame 46 releasing the capstan 68 from engagement with the worm wheel 60*g* through the clutch 62. The pressure in the towed vehicle brake system and the influence of the brake return spring 69 draw the cable 64 off of the capstan 68, returning the towed vehicle brake system to an unactuated state.

A further interval exists. From the release of the capstan 68 at time 41*e*, until the duty cycle repeats which is the Cable Release 47 interval, making the system again receptive to pressure values from the pressure sensor 30. This too is a configurable variable and is designated, in the preferred embodiment much as the Programmed Brake Delay 42 and is termed the Cable Release 47 interval.

The preferred embodiment of the invention includes other designatable parameters that allow for adjustment in the operation of the instant invention to enhance drivability and the modification of these parameters might be by preprogrammed designation, user designation or, as discussed above, through artificial intelligence applied to readings from accelerometers in either or both of the towing and towed vehicles. Some of these configurable parameters might optionally include:

1) RESET DEFAULT VALUES—Selecting this option allows a technician to reset each of the previously programmed values to a factory designated default setting as might be stored in a current version of firmware.
2) PROGRAM MAXIMUM PRESSURE—This parameter designates the maximum pressure the pressure sensor 30 will accept as valid rather than to indicate a device fault, e.g. ranges indicative of air- or hydraulic-based braking in the towing vehicle.
3) PROGRAM MINIMUM PRESSURE—This parameter represents the minimum pressure the pressure sensor 30 will accept as valid rather than to indicate a device fault, e.g. ranges indicative of air- or hydraulic-based braking in the towing vehicle.
4) PROGRAM APPLICATION PROPORTION PERCENTAGE—this parameter designates the scope of cable 64 paid out or taken as the difference between the maximum and minimum cable lengths representing normal operation of the instant invention in this particular towed vehicle.
5) PROGRAM MOTOR SPEED PERCENTAGE—Much as with the Programmed Brake Delay 42, operation might prove that using the DC Motor at speeds less than its maximum show demonstrable improvement in either wear to the towed or towing vehicle brake systems or to drivability in general and this parameter will decrease the speed of the motor 60 as it takes up the cable 64 on the capstan 68.
6) PROGRAM ACTIVATION START THRESHOLD—This parameter sets a minimum threshold where the braking operation in the towed vehicle makes sense. For example, in driving, an operator might wish to "feather" the brakes in the towing vehicle to correct or ease steering. Braking in the towed vehicle might make that maneuver a bit less intuitive. As such, it would not be productive to have a slight pressure on the brakes of the towing vehicle to set up a corresponding braking in the towed vehicle. Further, if minor pressure fluctuations in the braking system of the towing vehicle might best be ignored by the towed vehicle.
7) PROGRAM DEVICE DECREASE THRESHOLD—Corresponding to the minimum threshold or Program Activation Start Threshold, this parameter sets a threshold for the amount of pressure loss in the towing vehicle brake system that must occur before the device acts to release the cable.
8) PROGRAM TRAVEL INCREASE THRESHOLD—Finally, in the operating range, this parameter determines the threshold for the amount of pressure that would have to be added to an already pressurized sensor before the device acts to take up more of the cable 64.
9) FULL BRAKE ENGAGEMENT MOTOR TIME—This parameter determines the amount of time necessary for the motor 60 to pull the cable 64 causing the pedal 9 to translate through its full travel.

More designatable parameters might prove to be useful in other embodiments of the invention. These are provided within this explanation in order to set forth the versatile and tailorable nature of this supplementary braking system.

Figure 7:
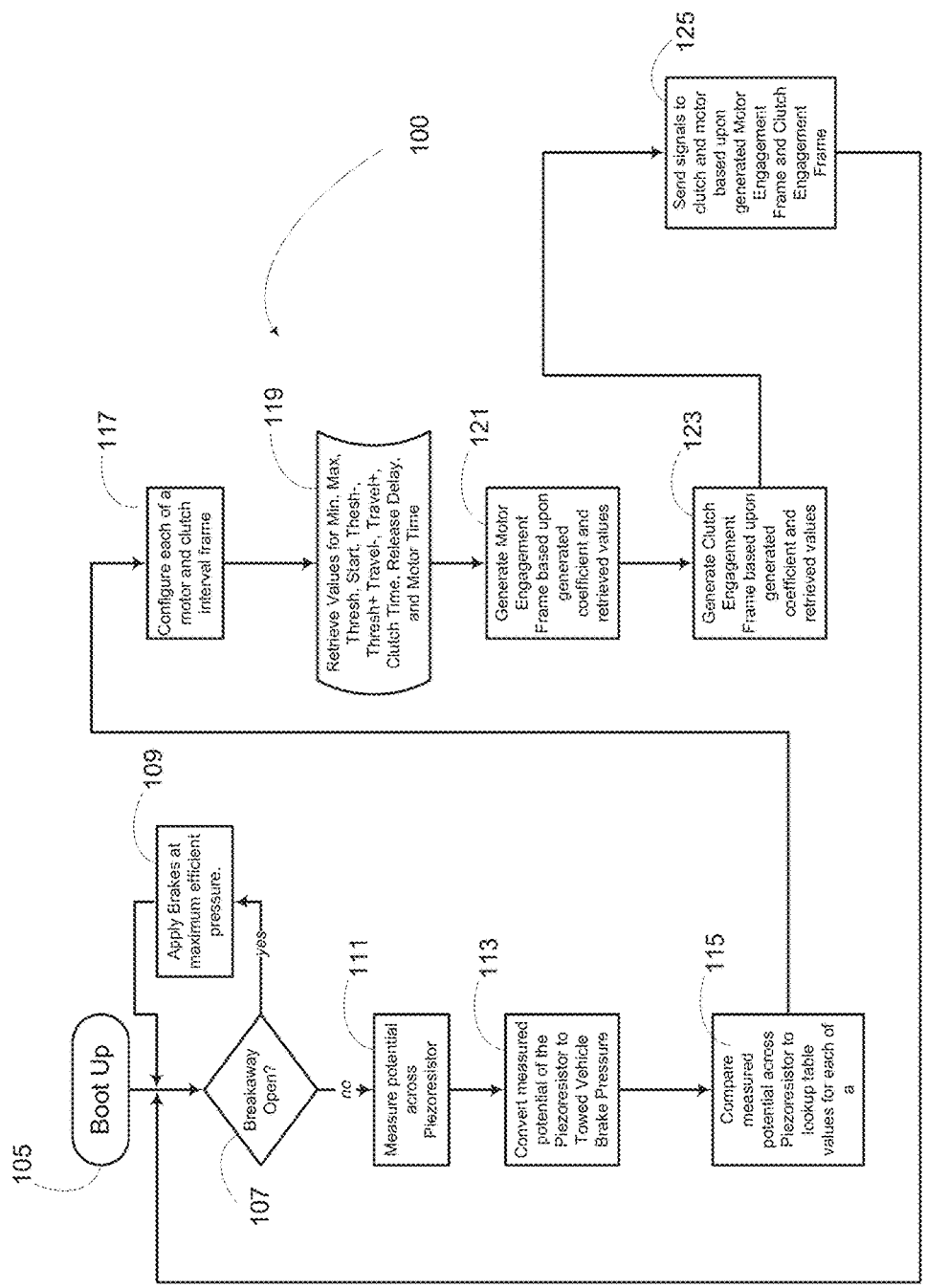
FIG. 7 is a flowchart depicting actions by a controller in the inventive supplemental braking system.

In FIG. 7, a flowchart 100, shows exemplary rudiments of operation by the control board 40. Once the master switch 56 (FIG. 4) is closed energizing the control board 40 allowing boot up at 105. After boot up at 105, the control board checks the voltage across the breakaway switch 52 at 107 and if the breakaway switch 52 is open, at 109, the control board sends a signal to the clutch 62 and motor 60 consistent with application of the maximum braking force applied to the brake pedal 9 (FIGS. 4, 5). To achieve this, the system draws the cable 64 to draw the pedal 9 to its minimum pedal height (FIG. 5). The brakes will not be released until the breakaway switch 52 is closed or the master switch 56 is turned to the "off" position.

If the breakaway switch 52 is closed, the method proceeds, at 111, to acquire a pressure from the pressure sensor 30 by measuring the potential across the sensor because of piezoresistance. In a 12-volt system, the most likely method will be by exploiting a voltage divider with a reference resistance. The reference resistor having a reference resistance is placed in series with the pressure sensor. By knowing the ratio, for example, that the potential across the reference resistor bears to a regulated 12 volts, the resistance of the piezoresistor in the pressure sensor is known and by derivation, at 113, the pressure in the towing vehicle braking system.

The resistance across the pressure sensor may optionally be converted to a pulse width modulated signal or may be expressed to the control board 40, or by direct measurement, or by any other conventional manner but, the control board is made aware of the instantaneous pressure in the towed vehicle braking system. Based upon that sensed pressure, at 111, each of a motor interval and a clutch interval are retrieved. (Throughout the remainder of this discussion, the terms "frame" and "interval" will be used interchangeably—each will refer to the period the control board sends an active signal to the respective device causing either of the motor to turn or the clutch to engage.). The values are retrieved at 115 and these are translated into clutch and motor frames at 117.

Given the tremendous reduction the worm screw 60s and the worm wheel 60g perform in transmitting torque from the motor 60 to the capstan 68, the interval in which each of the motor and clutch are together engaged in duration is very nearly proportionate to the scope of cable 64 the motor 60 winds around the capstan 68. This is to say that except at the extreme, the effects of friction and pressure within the towed vehicle brake system are such as to provide a nearly linear relationship. In much of the operating range, then, the duration of the interval when both brake and clutch are engaged will, be the important metric for quantifying braking. More time engaged means more cable 64 is wound around the capstan 68 and consequently the pedal 9 is drawn to a pedal height much closer to the floor pan. The closer the pedal 9 is drawn to the floorpan, the more pressure the towed vehicle exerts on the brake pads that stop the vehicle.

In operation, then, a proportion to the pressure sensed is determined by the settings of the software in the control board. By way of nonlimiting example, consider that for simplification of the explanation, the lookup values are set to be exactly proportionate to the pressure in the towing vehicle braking system. Then, by way of example, a hydraulic brake system in the towing vehicle has an operating range of between 0 psi to 3000 psi and a maximum cable travel of four inches (4"). When the pressure sensor indicates a pressure of 1500 psi then, in concert, the motor 60 and clutch 62 would, in response to signals from the control board 40 draw the cable 64 to reduce the pedal height by two inches (2"). A reduction of the pressure in the towing vehicle braking system to 1200 psi would cause the motor 60 and clutch 62 to draw the cable 64 one and ⅗ inches (1.6"). An increase of pressure to a full 3000 psi would result in the cable 64 being drawn the full four inches (4").

As described herein, the presently preferred relationship between pressure sensed and pedal travel is linear, though the invention is not limited to a strictly linear relationship between pressure and pedal travel. For example, the processor 40 might also include a linear motion encoder attached to a slide receiver such as is used in electronic surge braking systems in the tow bar. When rates of deceleration of the towing and towed vehicle differ, the slide receiver either extends or contracts to accommodate the distinct rates of deceleration of the two vehicles. The processor can then amend the values stored within the look up tables to increase or to decrease the motor and clutch frames to yield braking functions that exert the minimal extension or compression of the slide receiver during braking, thereby assuring optimal stopping distances as the deceleration characteristics of neither vehicle will tend to dominate the other.

Figure 8:
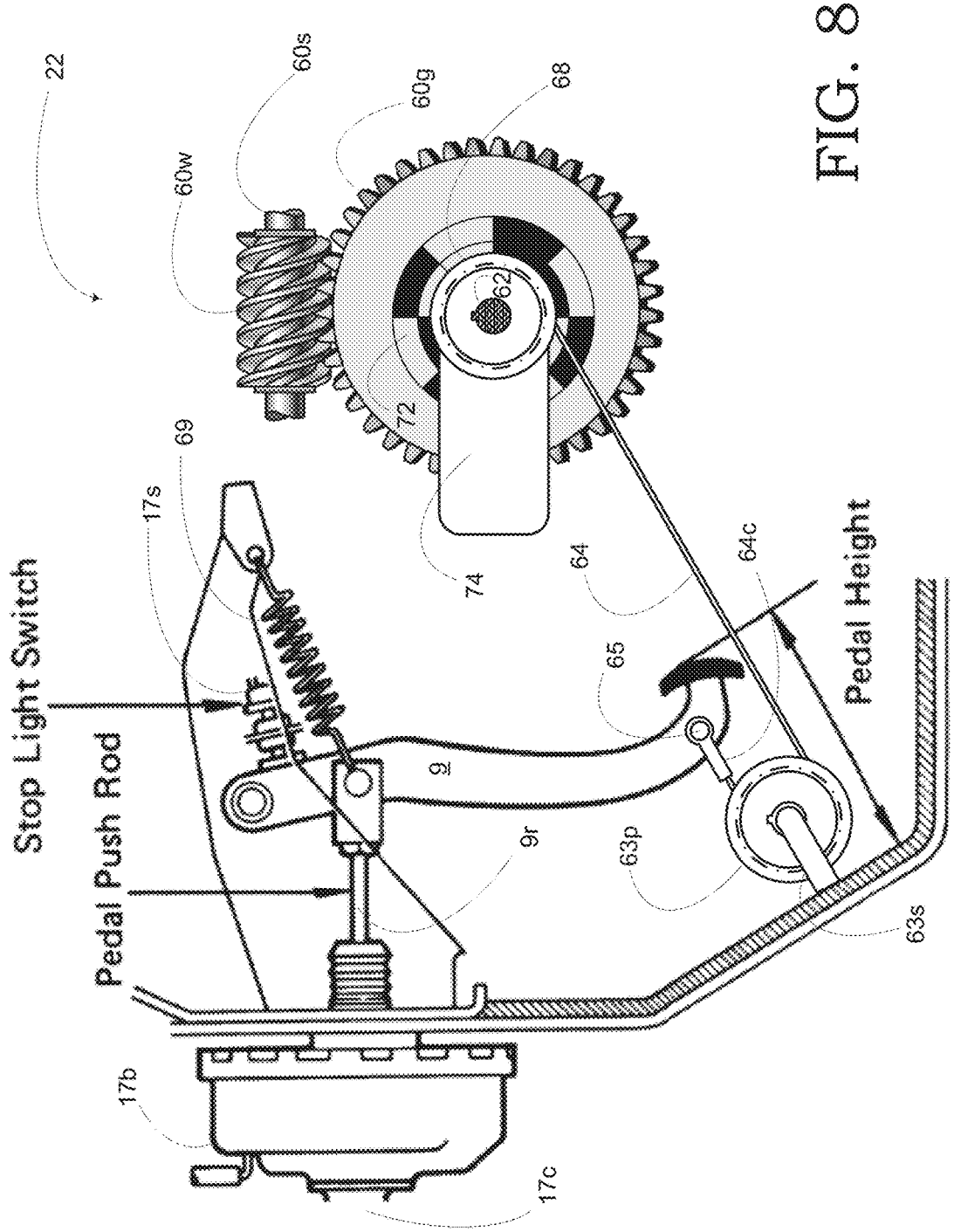
FIG. 8 is an exemplary block diagram of a preferred embodiment of the invention depicting a motor capstan assembly activated by the inventive supplemental braking system in connection with braking system of the towed vehicle and including a rotary encoder.

A preferred embodiment of the invention is depicted in FIG. 8 and differs from the more generalized embodiment depicted in FIG. 5 by the graphic addition of two components which collectively act as a rotary encoder also known as a shaft encoder. An optical rotary encoder is shown for explanatory purposes but nothing limits application to optical encoders. A rotary encoder sensor assembly 74 is configured and positioned in this nonlimiting example to read three concentric rings drawn on a rotary encoder rotor 72. In this example, the rotary encoder rotor 72 shows sectors of three concentric rings imprinted on a disk affixed to the capstan 68. The pattern of the rings on the rotary encoder rotor 72 represents the position of the capstan 68 in 3-bit binary. Considering that a full revolution of the capstan 68 can be expressed as rotating through 360 degrees, a table dividing the rotation of the capstan into V or eight position states can be expressed thus:

| Standard Binary Encoding | | | | |
|---|---|---|---|---|
| Sector | Contact 1 | Contact 2 | Contact 3 | Angle |
| 0 | off | off | off | 0° to 45° |
| 1 | off | off | ON | 45° to 90° |
| 2 | off | ON | off | 90° to 135° |
| 3 | off | ON | ON | 135° to 180° |
| 4 | ON | off | off | 180° to 225° |
| 5 | ON | off | ON | 225° to 270° |
| 6 | ON | ON | off | 270° to 315° |
| 7 | ON | ON | ON | 315° to 360° |

The inner ring of the rotor (obscured by the position of the capstan 68) corresponds to readings of the rotor 72 by contact 1 of the rotary encoder sensor assembly 74 as are compiled as the most significant digit in the table. In this exemplary configuration black sectors are selected to represent an "on". As shown zero degrees is positioned as pointing horizontally and on the right-hand side, opposite the rotary encoder sensor assembly 74, though the initial position is arbitrary. Also, as depicted the binary addresses of the positions increase as the rotor turns in a counterclockwise direction past the sensors. Optical sensors and light sources within rotary encoder sensor assembly 74 "read" each of the sectors of the rings immediately adjacent to the sensors as either "on" or "off" so that at any given time, the rotary encoder sensor assembly 74 can determine, in this example, the rotational position of the capstan with an accuracy of ±22.5 degrees, or 360 degrees/8 sectors. Where greater accuracy is desired, more sensors yield shorter sectors. Four sensors means $2^4$ or 16 sectors yielding twice the resolution or an accuracy of ±11.25 degrees and so forth.

The rotary encoder the embodiment exploits is not limited to an optical decoder. In fact, the invention will perform with any electro-mechanical device that converts the angular position or motion of a shaft or axle to an analog or digital signal. In practice, there are two main types of rotary encoders and either will work; encoders are either absolute or incremental (also referred to as relative). The output of absolute encoders indicates the current position of the shaft, making them angle transducers. The output of incremental encoders provides information about the motion of the shaft, which is typically further processed elsewhere into information such as speed, distance and position. Devices controlled by incremental encoders may have to "go home" to a fixed reference point to initialize the position measurement. But, one such "go home" position is the "at rest" or "zero percent activated" position of the capstan 68 in the actuator. While the above-described embodiment is set out as an absolute encoder for purposes of clarity, those having ordinary skill in the art will readily perceive that algorithms will allow use of either to advantage and nothing in this disclosure is intended to limit the encoder to absolute encoders.

While selected for purposes of description, a reflective optical encoder is shown, there are also transmissive optical encoders, i.e. those that employ a light shining onto a photodiode through slits in a metal or glass disk. These are otherwise equivalent to their reflective cousins. The sensors perceive light when it passes through the rotor. While such encoders are the most common technology and an acceptable solution, optical encoders are very sensitive to dust and dust might readily be present in the footwell of the "dinghy".

Another variant on the optical encoder is the conductive encoder, rather than optically readable sectors, the sectors are embedded as conductive sectors on the capstan 68 or a series of circumferential copper sectors or tracks are etched or deposited onto the rotor 72 attached to the capstan 68. Contact brushes within the rotary encoder sensor assembly 74 are arranged to sense the conductive areas as they pass. This form of encoder however is less favored because of wear due to the brushes continual contact with the moving rotor 72.

Just as the invention is not limited to conductive, transmissive or reflective encoders, the technology the rotary encoder employs is not limited to optical-type encoders. For example, one alternate encoder considered is a rotary magnetic encoders which are, typically, small, inexpensive devices. Magnetic encoders are used in high-volume applications, such as vehicle antilock braking systems, or sophisticated units demanding motion control tasks, such as industrial automation systems and medical equipment. Available variations are incremental and absolute types; non-contact and bearing versions; and units in which rotating unit and encoder body are effectively separate subcomponents.

Sensing of magnetic fields is accomplished by exploiting the Hall effect. The Hall effect exploits the production of a voltage difference (the Hall voltage) across an electrical conductor, transverse to an electric current in the conductor and to an applied magnetic field perpendicular to the current. It was discovered by Edwin Hall in 1879. When passing through a magnetic field a test current will fluctuate upwards or downwards based upon orientation of the magnetic field relative to the sensor. By alternating the orientation of magnets in the rim of the capstan 68, the Hall effect sensor can count sectors as they pass. Consequently, Hall sensors containing 32-pole encoder wheels generate 16 pulses per revolution.

To avoid the effects of dust, one technology that might be used to good advantage is that described as on-axis magnetic and typically uses a specially magnetized 2 pole neodymium magnet attached to the motor shaft. Because it can be fixed to the end of the shaft, it can work with motors that only have 1 shaft extending out of the motor body. The accuracy can vary from a few degrees to under 1 degree. Resolutions can be as low as 1 degree or as high as 0.09 degree (4000 CPR). Such high accuracy is useful but not necessary. Another magnetic rotary decoder technology is known as off-axis magnetic and could readily be employed. In its most cost-effective embodiment, off-axis magnetic decoders use rubber bonded ferrite magnets attached to a metal hub in a manner similar to the optical sectors or conductive traces set forth above. Such a configuration offers flexibility in design and low cost. Due to the flexibility in many off axis encoder chips they can be programmed to accept any number of pole widths so the chip can be placed in any position required for the application.

Magnetic encoders operate in harsh environments where optical encoders would fail to work. Another such encoder that would also work in the harsh environment of the dinghy driver's foot well is a capacitive absolute encoder. In such an embodiment, an asymmetrical shaped disk is rotated within the encoder. Such a rotor might be shaped with a spiral perimeter to intrude further into the interspace between two electrodes as the shaft rotates. The presence of the metal disk changes the capacitance between the electrodes in a predictable manner which can be measured and calculated back to represent an angular value.

Not only are there a number of different and suitable encoders but there are also a variety of coding conventions that should be discussed. The example, above, relies upon standard binary encoding, that is to represent the eight sectors by the eight binary values in ascending order. But, not all encoders represent position in that manner. There is a drawback in that unless the contacts are perfectly aligned or if the rotor 72 stops between two adjacent sectors, or the contacts are not perfectly aligned, the value sensed may not accurately reflect the true position of the shaft.

Referring to the truth table above, consider what happens when the shaft angle changes from 179.9° to 180.1° (from sector 3 to sector 4). At some instant, according to the truth table, the contact pattern changes from off-on-on to on-off-off, meaning each of three sensors must change state to measure a single sector change. It is only when all of the contacts are perfectly aligned, that all three contacts can change state simultaneously to produce a smooth movement from sector 3 to sector 4.

In a practical device, the contacts are never perfectly aligned, so, in practice, each of the switches changes state at a different moment. If contact 1 switches first, followed by contact 3 and then contact 2, for example, in a very short scope of rotation, the actual sequence of codes would change from off-on-on (starting position) to on-on-on (first, contact 1 switches on), then to on-on-off (next, contact 3 switches off) arriving, finally at on-off-off (contact 2 switches off). To the processor reading from the encoder, in this example, the sectors the sensor assembly reads are, in sequence, 3, 7, 6 and then 4. So, from the sequence of codes produced, the shaft appears to have jumped from sector 3 to sector 7, then gone backwards to sector 6, then backwards again to sector 4, which is where we expected to find it. Such information would be very difficult for the inventive braking system to use in this embodiment, and generating the above-described confusion is unnecessary. For this reason, the preferred embodiment of the invention would exploit a known convention called Gray encoding.

The rotary encoder rotor for angle-measuring devices marked in 3-bit binary-reflected Gray code (BRGC) differs from standard binary annotation. Using BRGC in this ongoing example, the inner ring corresponds to Contact 1 as in the standard binary table. Remembering that the inner ring corresponds to the most significant digit, i.e. $2^3$ or 8, the sectors of the inner ring simply split the circular path into two halves. Then, it is the purpose of the second ring to split each of these two sectors in half but transitions cannot occur where the inner ring splits the sector. Thus, in BRCG, the second ring or middle ring simply replicates the inner ring but is offset by 90 degrees. As one imagines it, these two rings will divide a single rotation into four sectors but only one ring will trigger at a time. Thus, just as in the binary coding example, two sensor can divide the rotation into four sectors, but that division occurs without requiring simultaneous transitions on the two rings.

Because we are using three contacts in this example, we can further divide each of the four sectors the first two rings define into two halves, however this division will alternate so that the second half of a sector will have the same value as the first half of the next sector so that the transition will not occur at any of the four sector lines. Thus, there are only four transitions in the BRCG third ring and they occur in the centers of each of the sectors the first two rings define. Thus, a four-sector ring having transitions offset by 45 degrees from those of the middle or inner rings would serve. For the three-contact example given above, the Gray-coded version of the truth table would be as follows:

| | | Gray Encoding | | |
|---|---|---|---|---|
| Sector | Contact 1 | Contact 2 | Contact 3 | Angle |
| 0 | off | off | off | 0° to 45° |
| 1 | off | off | ON | 45° to 90° |
| 2 | off | ON | ON | 90° to 135° |
| 3 | off | ON | off | 135° to 180° |
| 4 | ON | ON | off | 180° to 225° |
| 5 | ON | ON | ON | 225° to 270° |
| 6 | ON | off | ON | 270° to 315° |
| 7 | ON | off | off | 315° to 360° |

In this example, the transition from sector 3 to sector 4, like all other transitions, involves only one of the contacts changing its state from on to off or vice versa. This means that the sequence of incorrect codes shown in the previous illustration cannot happen.

A further refinement that may be advantageously exploited is the use of single-track Gray encoding. Just as the first two bits of the Gray encoded three-bit code can be generated by simply offsetting one sector pattern by ninety degrees, the result is to create four distinctly coded sectors. If the most significant bit is rotated enough, it exactly matches the next ring out. Since both rings are then identical, the inner ring can be omitted, and the sensor for that ring moved to the remaining, identical ring (but offset at that angle from the other sensor on that ring). Those two sensors on a single ring make a quadrature encoder with a single ring. Using a similar rationale, it is possible to arrange several sensors around a single track (ring) so that consecutive positions differ at only a single sensor; the result is the single-track Gray code encoder.

Referring again to FIG. 8, regardless of the type of sensors or encoding standard used by the encoder, we will, for discussion's sake, assume that rotary encoder sensor assembly 74 and the encoded rotor 72 cooperate to effect a meaningful encoder. Once the actuator 22 is installed, the actuator will perform a calibration; in the preferred embodiment, this calibration will be automatic and performed as a part of the boot-up. The actuator will note two important positions of the capstan 68 and, thus, the encoded rotor 72, as that position is recognized by the rotary encoder sensor assembly 74. The first of these two positions is that of the very onset of brake application and the second is the state of maximum brake application. Ideally, the first of these is a position where no brake application has yet occurred by the capstan 68, has wound sufficiently to tension the cable 64 and to "take up the slack" as may exist in the pedal assembly itself; such a position corresponding to the "zero percent activated" position referred to above and, importantly does not, in such a position, cause contact between the brake rotors and pads in the dinghy's braking system. So defined, all braking in the dinghy occurs as the capstan 68 rotates between these two points.

Once the entire range of brake pedal travel, sensed by capstan position, is defined as occurring between these two points, the preferred embodiment defines braking of the dinghy as a function connecting these two points. While it is envisioned that the processor 40 includes a memory on which may reside several specific automobile profiles, each that represents an optimal braking of a specific vehicle serving as a dinghy, in the presently preferred embodiment, a generic profile is a linear function between the two points. This generic profile is used to define the relationship between applied brake pedal travel as a function of the specific sensed pressure at the pressure sensor 30 (FIGS. 3 and 4). Thus, in the preferred embodiment the gearhead motor 56 turning the capstan 68 through the clutch 62, will rotate the capstan 68 proportionately to the sensed pressure at the pressure sensor 30.

Just as explained relative to FIGS. 4, 5 and 6, the electromagnetic clutch 62 (FIG. 4) is interposed to allow the capstan 68 either to draw the cable 64 when engaged or to freewheel paying out the cable 64 when disengaged. When the control board 40 (FIG. 4) sends a current to actuate the clutch 68, the capstan 68 is accelerated to match the speed of the worm wheel 60g. If the motor 60 is spinning, engagement of the clutch 62 will cause the capstan 68 to take up cable 64 drawing the brake pedal 9 through its pedal height toward the floor pan. When the clutch 62 (FIG. 4) stops receiving the current from the control board 40, the capstan 68 is free to rotate and the force the return spring 69 exerts draws the cable 64 back off of the capstan 68 to an "at rest" position. Using this alternate engagement and disengagement of the clutch, the system 20 (FIG. 4) can rotate the capstan 68 to rest at a specific rotational position as dictated by the sensed pressure at the pressure sensor 30. In turn, as explained above, rotation of the capstan to a specific rotational position proportionally applies the brakes of the dinghy.

Figure 9:
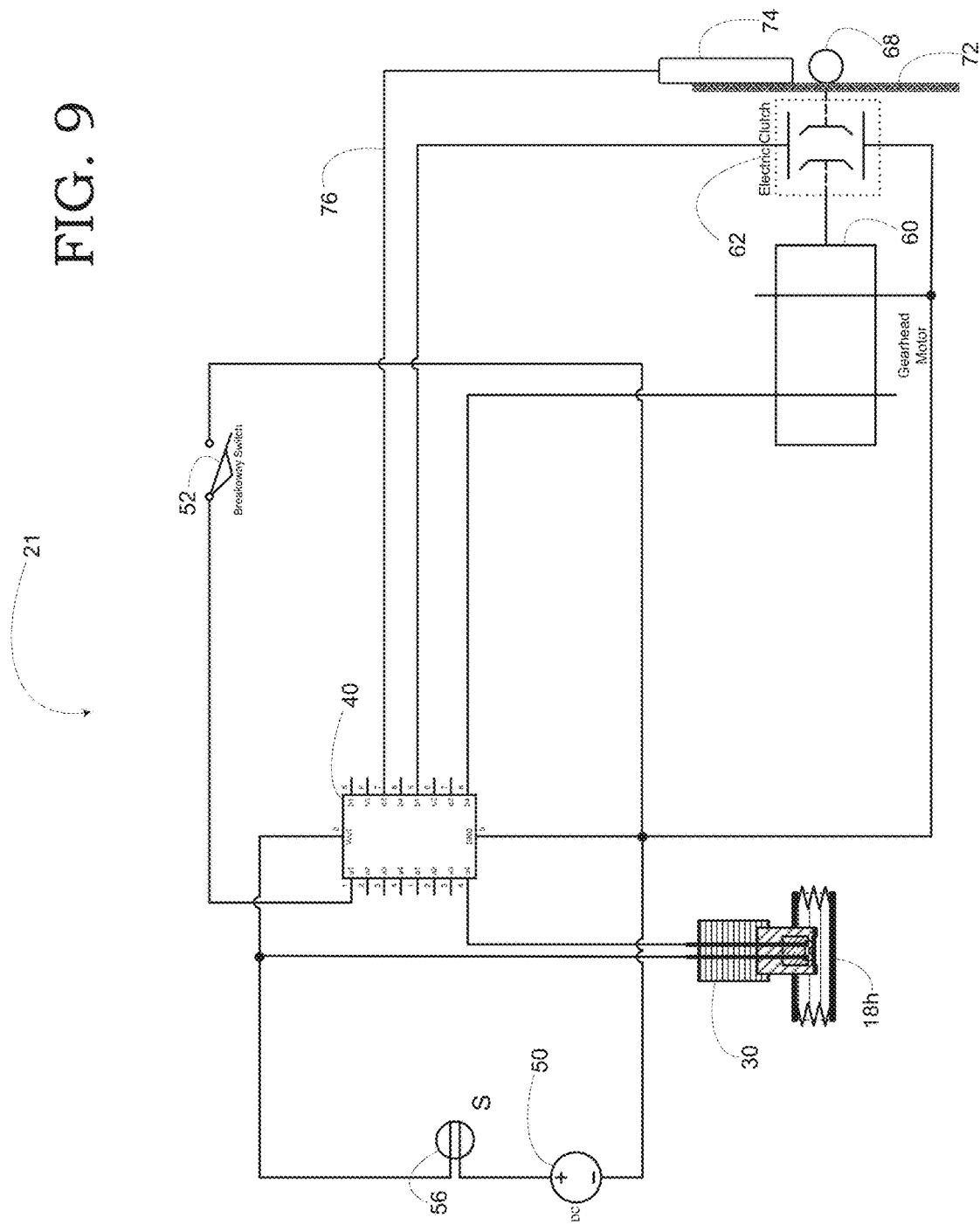
FIG. 9 is an exemplary block diagram depicting an inventive supplemental braking system including a rotary encoder.

The encoder sensor 74 provides, as feedback, the rotational position of the capstan 68. As shown in FIG. 9 (FIG. 9 differs from FIG. 4 only by the addition of the encoder rotor 72, the encoder sensor 74 and an encoder sensor trace 76), the encoder sensor trace 76 communicates the rotational position of the capstan 68 to the controller 40. Using the feedback information provided through the encoder sensor trace 76, the controller 40, then, can precisely depress the brake pedal 9 to apply pressure as the sensed pressure at the pressure sensor 30 in the towing vehicle brake line dictates. As such, the dinghy applies the most efficient braking so that the dinghy neither drags the towing vehicle nor overruns it in operation. By way of nonlimiting example, if the brake pressure of the towing vehicle calls for 50% brake pedal application and the brake was already applied at 25% from the previous pressure reading, then the brake would apply only that additional 25% to achieve the 50% brake application that is now being called for.

In operation, the encoder sensor provides a signal analogous to that in a phase-locked loop system in signal processing. The operation of a phase locked loop, PLL, is based around the idea of comparing the phase of two signals and then adjusting to minimize the phase difference between the two signals. This information about the phase difference between the two signals is then used to control the frequency of one of the signals to coincide with that of the other. In a similar manner, the difference between where the system believes the brake pedal of the dinghy is and were it actually is, is the analog to the error in phase or phase difference.

The system assures that the pedal displacement in the towed vehicle corresponds with the sensed pressure at the pressure sensor 30. The processor 40 employs an iterative process to assure that the percentage of the rotational range of the capstan 68 corresponds to the percentage of full pressure braking in the towing vehicle. The processor 40 compares the rotational position of the capstan 68 to the anticipated rotational position as dictated by the sensed pressure and the generates an adjustment value according to the magnitude and sign of the difference between the two values.

Figure 10:
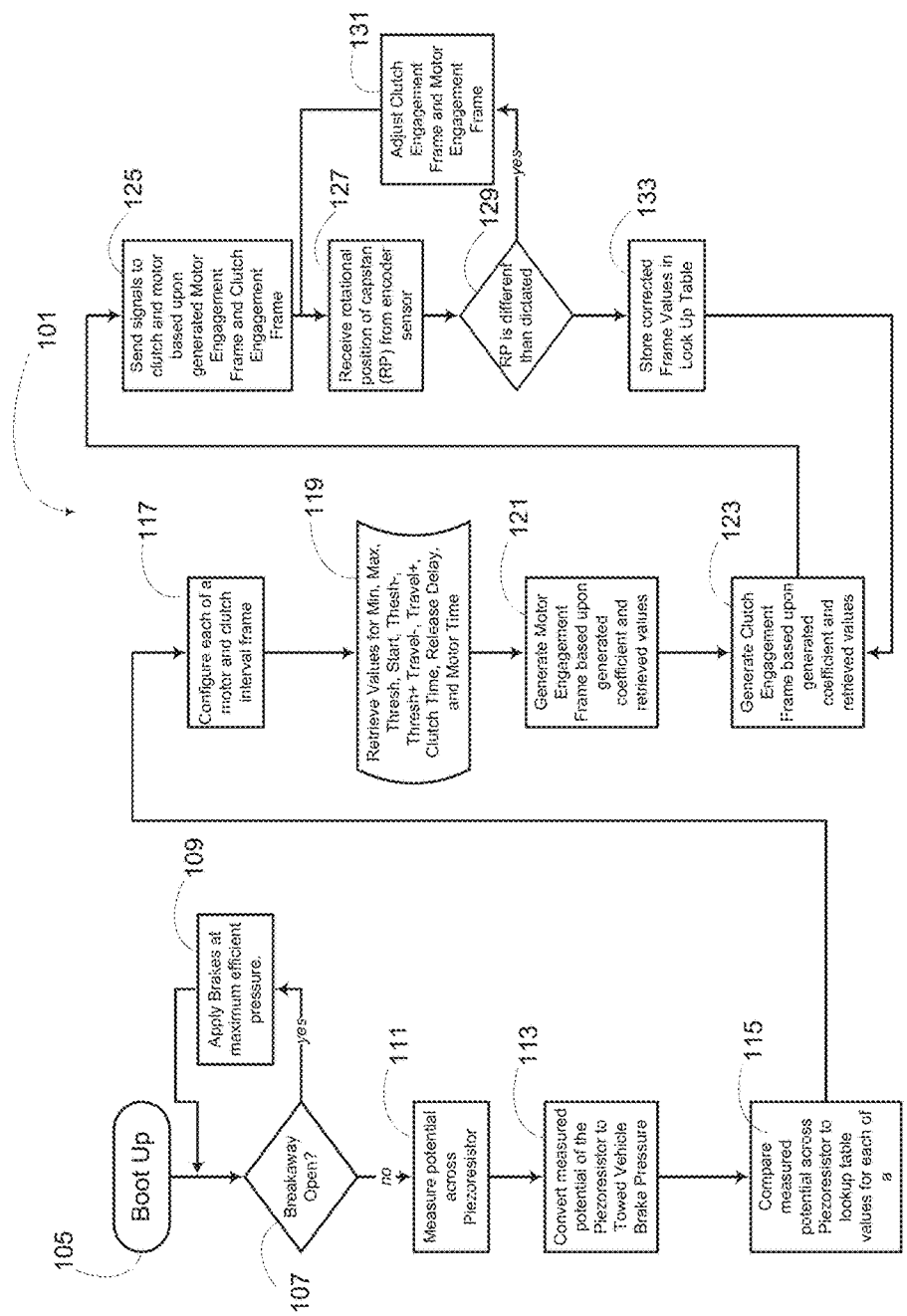
FIG. 10 is a flowchart depicting actions by a controller in the inventive supplemental braking system including a control loop based upon sensed rotary position of the capstan.

The inventive braking system having the rotary encoder exploits a method that differs slightly from that depicted in FIG. 7, above, and is depicted in this FIG. 10. Pressure within the brake lines in the towing vehicle changes the resistance in a sensing circuit in a known, repeatable, and predictable fashion. Thus, in the inventive system, for each resistance value measured across the pressure sensor, there is a unique value representing the appropriate depression of the brake pedal in the towed vehicle. The exact function that maps resistance across the pressure sensor onto brake pedal displacement values for optimal braking is selected to minimize differences in decelerating the two vehicles to achieve optimally shortened braking distances. Based upon that sensed pressure, at 111, each of a motor interval and a clutch interval are retrieved. (Throughout the remainder of this discussion, the terms "frame" and "interval" will be used interchangeably—each will refer to the period the control board sends an active signal to the respective device causing either of the motor to turn or the clutch to engage.). The values are retrieved at 115 and these are translated into clutch and motor frames at 117.

As described above, the interval in which each of the motor and clutch are together engaged in duration is very nearly proportionate to the scope of cable 64 the motor 60 winds around the capstan 68. This is to say that except at the extreme, the effects of friction and pressure within the towed vehicle brake system are such as to provide a nearly linear relationship. In much of the operating range, then, the duration of the interval when both brake and clutch are engaged will be the important metric for quantifying braking. More time engaged means more cable 64 is wound around the capstan 68 and consequently the pedal 9 is drawn to a pedal height much closer to the floor pan. The closer the pedal 9 is drawn to the floor pan, the more pressure the towed vehicle exerts on the brake pads that stop the vehicle. As in the example above, a hydraulic brake system in the towing vehicle has an operating range of between 0 psi to 3000 psi and wherein to brake the towed vehicle at a maximum rate requires a cable travel of four inches (4"). When the pressure sensor indicates a pressure of 1500 psi then, in concert, the motor 60 and clutch 62 would, in response to signals from the control board 40 draw the cable 64 to reduce the pedal height by two inches (2"). A reduction of the pressure in the towing vehicle braking system to 1200 psi would cause the motor 60 and clutch 62 to draw the cable 64 one and ⅗ inches (1.6"). An increase of pressure to a full 3000 psi would result in the cable 64 being drawn the full four inches (4"). But, without feedback, the processor 40 cannot confirm the exact correspondence between pressure in the towing vehicle brake line and deflection of the brake pedal in the towed vehicle.

In this presently preferred embodiment, the encoder sensor assembly provides values indicative of pedal position to allow adjustment of frame values to optimize those frame values. Given the processor's knowledge of the towed vehicle's "zero percentage" brake application and the maximum brake application, frame values can be adjusted so that pressure in the towing vehicle braking system to more accurately correspond to designed pedal travel values.

In practice, operation of the system accords largely with the operation of the nonlimiting exemplary system as described in FIG. 7. However, additional steps after block 125 are preformed to enhance the operation of the system under this presently preferred embodiment. When braking, at a block 127, the rotational encoder sensor 74 measures an instantaneous value for the rotational position of the capstan 68. This the processor 40 pairs with a corresponding instantaneous value for pressure (adjusted for latency in the system). Then, at a block 129, drawing from a look-up table, the processor compares the actual rotational position of the capstan 68 to the stored value corresponding to the measured instantaneous pressure in the braking system of the towing vehicle to calculate a difference having a magnitude and sign.

At a block 131, guided by the difference, the processor amends the stored values for each of the motor and clutch frames to minimize that difference by an iterative process. At a block 133, the adjusted values are stored, replacing the retrieved values in the look-up table. As the system homes in on the optimal braking pressure in the towed vehicle, the calculated differences will fall below a threshold value thereby obviating the need for adjustment.

Importantly, however, the system also compensates for expansion due to ambient temperature, stretch in the cable, or slight differences in mounting angle and position. Over time, the system can adjust to assure that the rotation of the capstan 68 precisely corresponds to the anticipated values for pedal depression.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for braking a towed vehicle based upon a braking pressure of a braking fluid in a braking circuit in the towing vehicle, the system comprising:
 a piezo resistor mounted to sense braking pressure within the braking circuit of the towing vehicle and comprising one leg of a voltage divider, thereby to present a piezo resistor voltage drop across the piezo resistor, the piezo resistor voltage drop corresponding to the braking pressure within the braking circuit; and
 a motor to actuate a brake system of the towed vehicle, the motor including a motor output shaft;

an electromagnetic clutch for coupling, at its clutch input, the motor output shaft to, at its clutch output, a capstan;

a rotary encoder for sensing the rotational position of the capstan;

a controller to retrieve a vehicle profile lookup table, the vehicle profile lookup table including each of the motor frame duration being a function of the sensed piezo resistor voltage drop and an anticipated rotational position as a function of motor frame duration the controller including:

a switching network to effect:

initiating a clutch frame, energizing a clutch to engage a motor output shaft;

initiating a motor frame upon expiration of a programmed clutch delay, energizing a motor to rotate the motor output shaft in response to a signal from the controller;

upon expiration of the motor frame duration, receiving a signal from the rotary encoder indicating an instantaneous rotational position of the capstan immediately prior to interrupting the power to the motor;

comparing the instantaneous rotational position of the capstan to the anticipated rotational position of the capstan to produce a rotational position difference; and storing an altered anticipated rotational position to replace the anticipated rotational position associated with the motor frame duration in the vehicle profile, the altered motor frame duration being based upon the motor frame duration and the rotational position difference.

2. The system of claim 1, wherein the motor is a gearhead motor and comprises a motor driving a reduction gear train to multiply torque at the motor output shaft relative to the torque generated by a motor rotor the motor includes by a factor exceeding four times.

3. The system of claim 2, wherein the reduction gear train is selected from a group consisting of a worm and worm gear train; a planetary gear train; a bevel gear train; a pinion and spur gear train; a helical gear train; and a double helical gear train.

4. The system of claim 2, wherein the switching network further effects:

upon termination of the motor frame, continuing engagement of the clutch until the expiration of a cable lock up frame terminating the clutch frame by releasing engagement of the clutch.

5. The system of claim 1, wherein a cable wraps the capstan and is connected to a towed vehicle brake pedal such that upon engagement of the clutch, rotation of the motor output shaft rotates the capstan to take up the cable and, thereby, to draw the towed vehicle brake pedal in a manner to actuate the towed vehicle braking system, engaging the towed vehicle brakes.

6. The system of claim 1, wherein retrieving a motor frame duration based upon the measured piezoresistor voltage drop further includes:

populating the lookup table with a multiplicity of motor frame durations, each motor frame duration being associated with at least one piezoresistor voltage drop; and indexing the multiplicity of motor frame durations for retrieval based upon a selected piezoresistor voltage drop.

7. The system of claim 6, wherein populating a lookup table with a multiplicity of motor frame durations, each motor frame duration being associated with at least one piezoresistor voltage drop further includes:

initializing the lookup tables with initial estimates of the motor frame duration being associated with at least one piezoresistor voltage drop;

retrieving a first motor frame duration based upon a measured piezoresistor voltage drop;

measuring at least one of deceleration of the towing vehicle and brake temperature of towed vehicle braking system, based upon the use of the first motor frame duration;

generating a second motor frame duration based upon the measured piezoresistor voltage drop, the second motor frame duration being distinct from the first motor frame duration by an integral multiple of a selected motor frame duration increment;

measuring the at least one of deceleration of the towing vehicle and brake temperature of towed vehicle braking system, based upon the use of the first motor frame duration comparing the first motor frame duration to the second motor frame duration to determine a new first motor frame duration solution based upon the measured values of the at least one of deceleration of the towing vehicle and brake temperature of the towed vehicle braking system;

continue to vary the first motor frame duration by distinct integral multiples of the selected motor frame increment to develop a plurality of solutions;

evaluating the plurality of solutions until said at least one of said plurality of solutions determines a local minimum the at least one of deceleration of the towing vehicle and brake temperature of the towed vehicle braking system; and store the first motor frame duration associated with the local minimum of the at least one of deceleration of the towing vehicle and brake temperature of the towed vehicle braking system as the motor frame duration associated with the at least one piezoresistor voltage drop.

8. The system of claim 1, further comprising a mechanism to:

compare deceleration of the towed vehicle relative to the towing vehicle while the braking.

9. A method for braking a towed vehicle based upon a braking pressure of a braking fluid in a braking circuit in the towing vehicle, the method comprising:

measuring a piezoresistor voltage drop across a piezoresistor positioned within the braking circuit such that the piezoresistor voltage drop changes in response to the braking pressure within the braking circuit;

retrieving a motor frame duration based upon the measured piezoresistor voltage drop;

engaging a clutch to a motor output shaft to initiate a clutch frame, the clutch having a clutch input attached to the motor output shaft and a clutch output attached to a capstan;

upon expiration of a programmed clutch delay, initiating a motor frame by supplying power to a motor to rotate the motor output shaft and the engaged clutch;

continuing to supply power to the motor to rotate the motor output shaft and the engaged clutch throughout the motor frame duration; and upon expiration of the motor frame duration, storing a sensed rotational position of the capstan and, upon sensing the rotational position of the capstan, terminating the motor frame by interrupting the power to the motor.

10. The method of claim 9, wherein the motor is a gearhead motor and comprises a motor driving a reduction gear train to multiply torque at the motor output shaft relative to the torque generated by a motor rotor the motor includes by a factor exceeding four times.

11. The method of claim 10, wherein the reduction gear train is selected from a group consisting of a worm and worm gear train; a planetary gear train; a bevel gear train; a pinion and spur gear train; a helical gear train; and a double helical gear train.

12. The method of claim 10, wherein the method further comprises:
upon termination of the motor frame, continuing engagement of the clutch until the expiration of a cable lock up frame to terminate the clutch frame by releasing engagement of the clutch.

13. The method of claim 9, wherein a cable connects the capstan to a towed vehicle brake pedal such that upon rotation of the capstan, the cable is taken up drawing the towed vehicle brake pedal downward in a manner to activate the towed vehicle braking system, engaging the towed vehicle brakes.

14. The method of claim 9, wherein retrieving a motor frame duration based upon the measured piezoresistor voltage drop further includes:
populating a lookup table with a multiplicity of motor frame durations, each motor frame duration being associated with at least one piezoresistor voltage drop;
indexing the multiplicity of motor frame durations for retrieval based upon a selected piezoresistor voltage drop;
generating an anticipated rotational position of the capstan associated with each motor frame duration.

15. The method of claim 14, wherein populating a lookup table with a multiplicity of motor frame durations, each motor frame duration being associated with at least one piezoresistor voltage drop further includes:
initializing the lookup tables with initial estimates of the motor frame duration being associated with at least one piezoresistor voltage drop;
retrieving a first motor frame duration based upon a measured piezoresistor voltage drop;
measuring at least one of deceleration of the towing vehicle and brake temperature of towed vehicle braking system, based upon the use of the first motor frame duration;
generating a second motor frame duration based upon the measured piezoresistor voltage drop, the second motor frame duration being distinct from the first motor frame duration by an integral multiple of a selected motor frame duration increment;
measuring the at least one of deceleration of the towing vehicle and brake temperature of towed vehicle braking system, based upon the use of the first motor frame duration
comparing the first motor frame duration to the second motor frame duration to determine a new first motor frame duration solution based upon the measured values of the at least one of deceleration of the towing vehicle and brake temperature of the towed vehicle braking system;
continue to vary the first motor frame duration by distinct integral multiples of the selected motor frame increment to develop a plurality of solutions;
evaluating the plurality of solutions until said at least one of said plurality of solutions determines a local minimum the at least one of deceleration of the towing vehicle and brake temperature of the towed vehicle braking system; and store the first motor frame duration associated with the local minimum of the at least one of deceleration of the towing vehicle and brake temperature of the towed vehicle braking system as the motor frame duration associated with the at least one piezoresistor voltage drop.

16. The method of claim 15, wherein the at least one of deceleration of the towing vehicle relative to the towed vehicle, tensile stress the connection between towing vehicle and the towed vehicle and brake temperature of the towed vehicle braking system are measured at a selected piezo resistor voltage drop during braking by the towing vehicle and the motor frame duration associated with that piezo resistor voltage drop.

17. A supplemental braking system for a towed vehicle, the system comprising:
a controller, the controller being responsive to a signal from a towing vehicle indicating application of the towing vehicle braking system, the controller including a switching network connected to:
receive a sensed capstan rotational position;
selectively activate a clutch; and
selectively energize a motor;
the motor having a motor output shaft connected to the clutch, the motor rotating when energized by the switching network;
the clutch, engaged when activated by the switching network, the clutch rotates with the motor output shaft;
a capstan attached to the clutch such that the capstan rotates with the motor output shaft when the clutch is engaged;
a rotary encoder to sense the capstan rotational position; and
a cable connecting the capstan to a brake pedal in the towed vehicle, such that when the capstan rotates the cable draws the brake pedal to engage brakes in the towed vehicle.

18. The supplemental braking system for a towed vehicle of claim 17, wherein the signal from the towing vehicle indicating application of the towing vehicle braking system is a change in a piezoresistor voltage drop, the piezoresistor being mounted inside of the towing vehicle braking circuit to sense a pressure of a braking fluid in the towing vehicle braking circuit.

19. The supplemental braking system for a towed vehicle of claim 17, wherein the cable is selected from a group consisting of a wire rope, wire rope and pulley, a flexible nylon rack, a flexible nylon connector, a tie rod, a tape, and a Bowden cable.

20. The supplemental braking system for a towed vehicle of claim 17, wherein the controller activates the switching network to effect the following:
initiating a clutch frame, energizing a clutch to engage a motor output shaft;
initiating a motor frame upon expiration of a programmed clutch delay, energizing a motor to rotate the motor output shaft in response to a signal from the controller;
upon expiration of the motor frame duration, sensing the capstan rotational position and terminating the motor frame by interrupting the power to the motor; and
upon termination of the motor frame, continuing engagement of the clutch until the expiration of a cable lock up frame terminating the clutch frame by releasing engagement of the clutch.

21. The system of claim 20, wherein the motor is a gearhead motor and comprises a motor driving a reduction gear train to multiply torque at the motor output shaft relative to the torque generated by a motor rotor the motor includes by a factor exceeding four times.

22. The system of claim 21, wherein the reduction gear train is selected from a group consisting of a worm and worm gear train; a planetary gear train; a bevel gear train; a pinion and spur gear train; a helical gear train; and a double helical gear train.

\* \* \* \* \*